United States Patent
Rakib et al.

(10) Patent No.: US 9,083,595 B2
(45) Date of Patent: Jul. 14, 2015

(54) SIGNAL MODULATION METHOD RESISTANT TO ECHO REFLECTIONS AND FREQUENCY OFFSETS

(75) Inventors: Shlomo Selim Rakib, Santa Clara, CA (US); Ronny Hadani, Austin, TX (US)

(73) Assignee: Cohere Technologies, Inc., Santa Clara, CA (US)

(*) Notice: Subject to any disclaimer, the term of this patent is extended or adjusted under 35 U.S.C. 154(b) by 653 days.

(21) Appl. No.: 13/430,690

(22) Filed: Mar. 27, 2012

(65) Prior Publication Data

US 2012/0201322 A1    Aug. 9, 2012

Related U.S. Application Data

(63) Continuation-in-part of application No. 13/117,119, filed on May 26, 2011, now Pat. No. 8,879,378.

(60) Provisional application No. 61/615,884, filed on Mar. 26, 2012, provisional application No. 61/349,619, filed on May 28, 2010.

(51) Int. Cl.
| | |
|---|---|
| H04L 25/03 | (2006.01) |
| H04L 27/26 | (2006.01) |
| H04L 5/00 | (2006.01) |
| H04W 28/04 | (2009.01) |
| H04W 28/06 | (2009.01) |
| H04W 72/00 | (2009.01) |

(52) U.S. Cl.
CPC ............ *H04L 27/265* (2013.01); *H04L 5/0016* (2013.01); *H04L 27/2613* (2013.01); *H04L 27/2634* (2013.01); *H04L 27/2655* (2013.01); *H04L 27/2697* (2013.01); *H04L 25/03343* (2013.01); *H04W 28/04* (2013.01); *H04W 28/065* (2013.01); *H04W 72/00* (2013.01)

(58) Field of Classification Search
None
See application file for complete search history.

(56) References Cited

U.S. PATENT DOCUMENTS

| | | | | |
|---|---|---|---|---|
| 2009/0303961 | A1* | 12/2009 | Popovic et al. | 370/330 |
| 2010/0008432 | A1* | 1/2010 | Kim et al. | 375/260 |
| 2010/0322349 | A1* | 12/2010 | Lee et al. | 375/299 |

\* cited by examiner

*Primary Examiner* — Mohammad Adhami
(74) *Attorney, Agent, or Firm* — Stephen E. Zweig

(57) ABSTRACT

A method of modulating communications signals, such as optical fiber, wired electronic, or wireless signals in a manner that facilitates automatic correction for the signal distortion effects of echoes and frequency shifts, while still allowing high rates of data transmission. Data symbols intended for transmission are distributed into N×N matrices, and used to weigh or modulate a family of cyclically time shifted and cyclically frequency shifted waveforms. Although these waveforms may then be distorted during transmission, their basic cyclic time and frequency repeating structure facilitates use of improved receivers with deconvolution devices that can utilize the repeating patterns to correct for these distortions. The various waveforms may be sent in N time blocks at various time spacing and frequency spacing combinations in a manner that can allow interleaving of blocks from different transmitters. Applications to channel sounding/characterization, system optimization, and also radar are also discussed.

20 Claims, 15 Drawing Sheets

Transmitter method

[$b^{m*}X^k$] is the mth base vector multiplied element wise with the Fourier kth vector. The sum of the various waveforms from $X^0$ to $X^{n-1}$ can be termed a "composite" waveform.

Receiver method

[b^m*X^k]' is the mirror conjugate of the mth base vector multiplied element wise with the Fourier kth vector

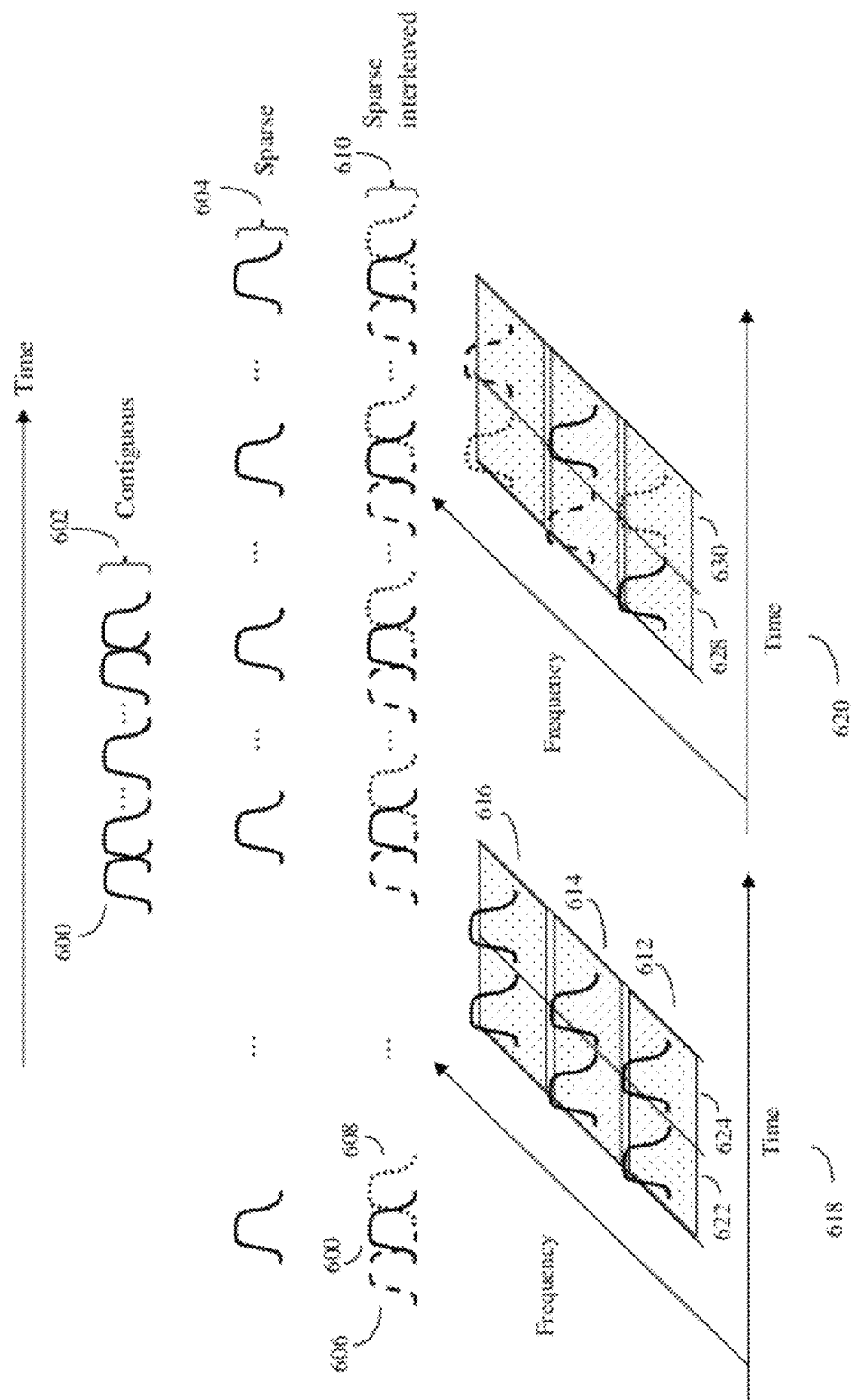

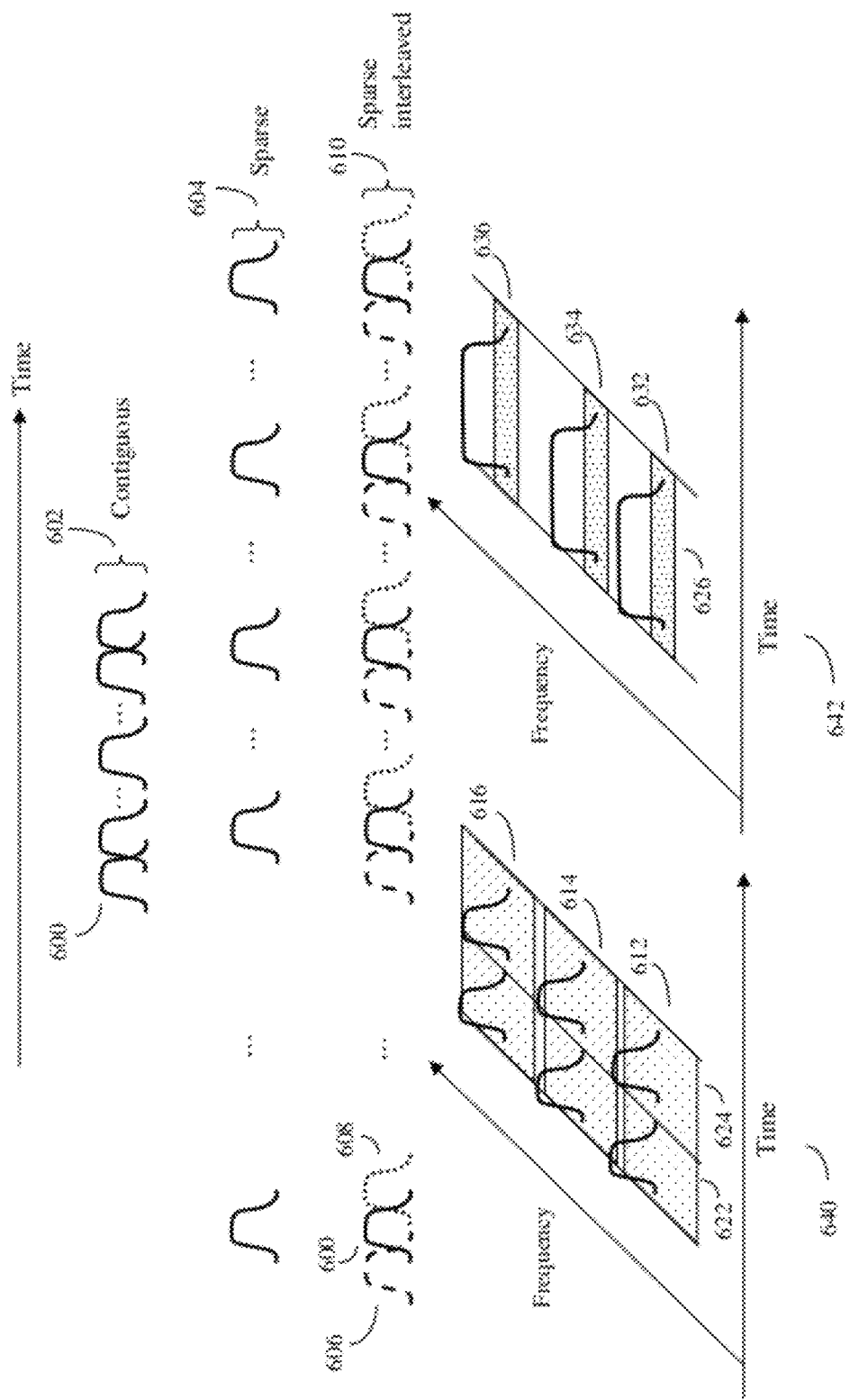

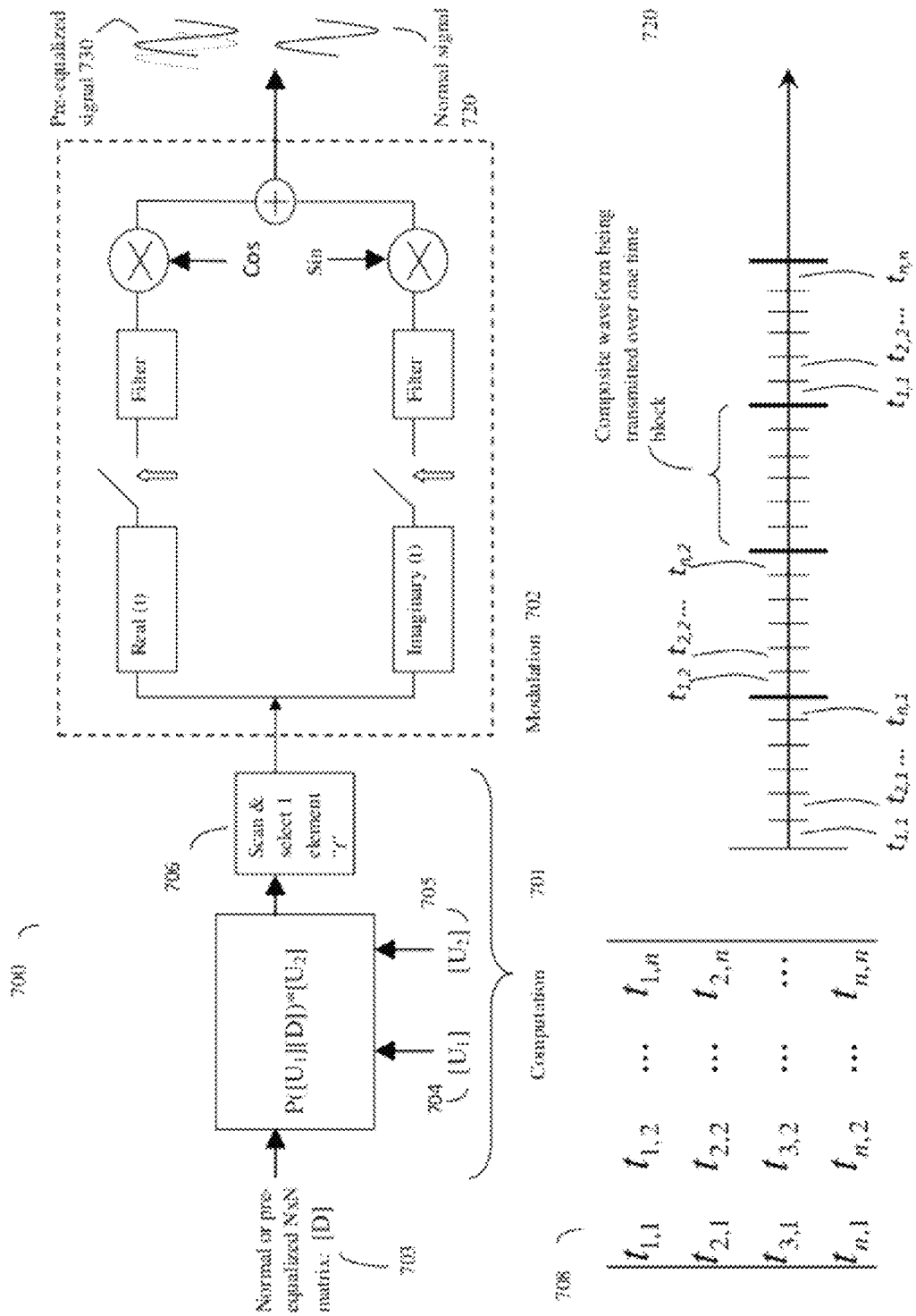

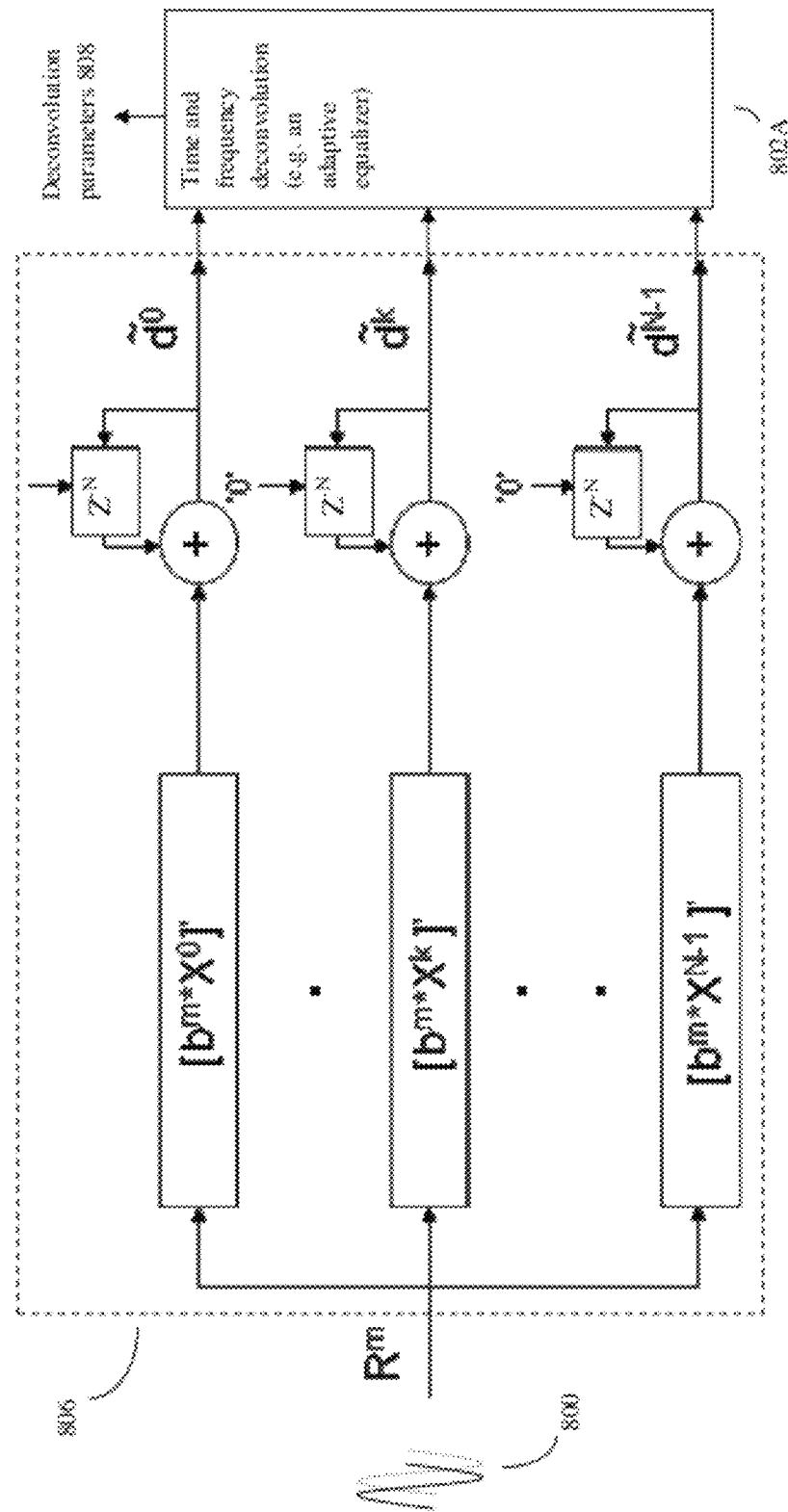

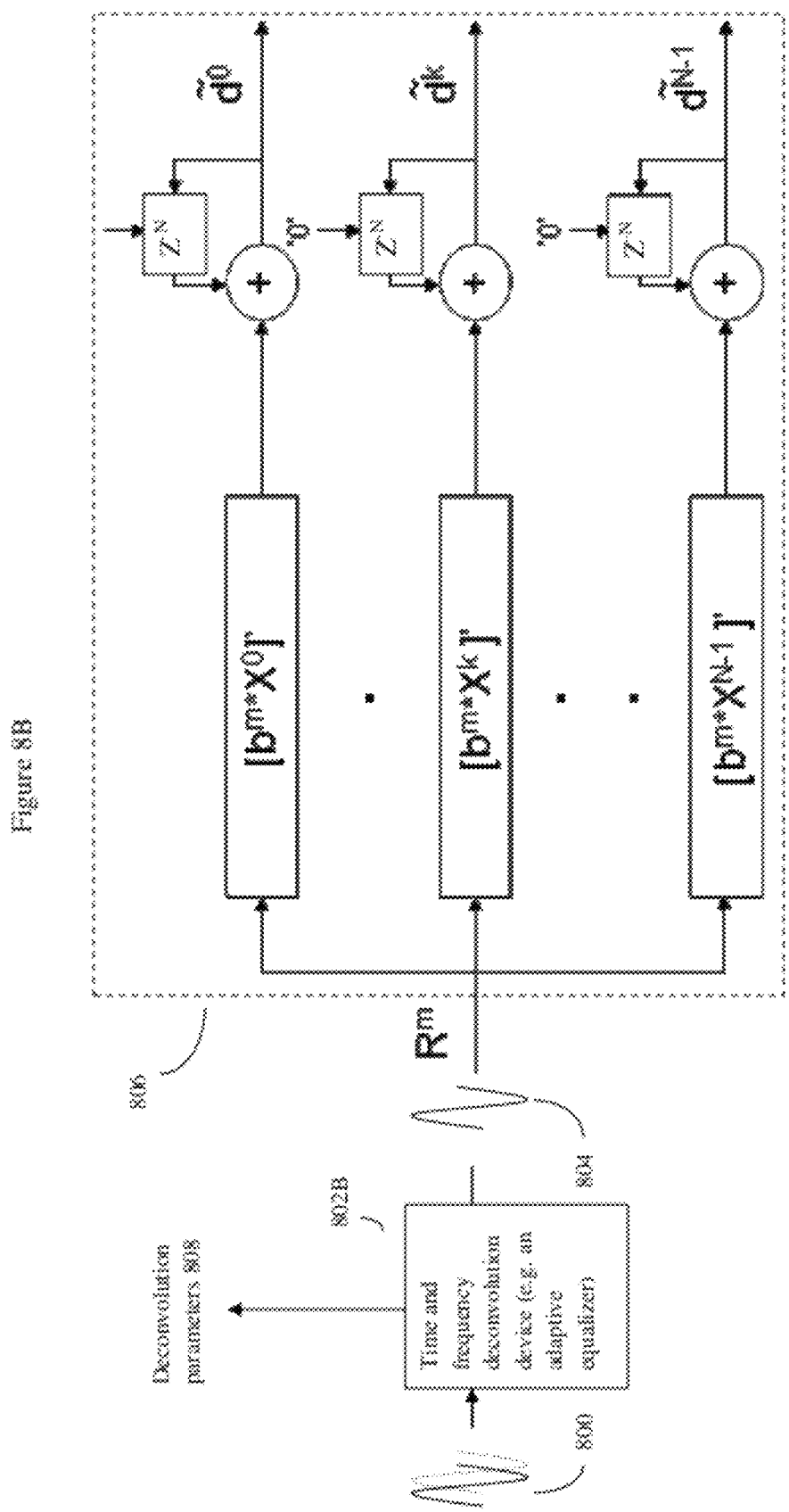

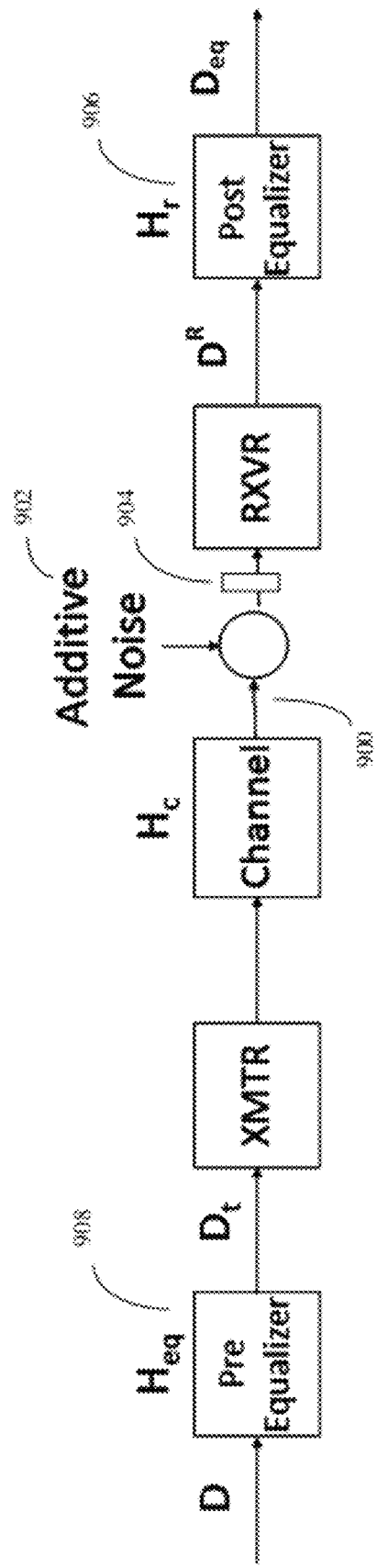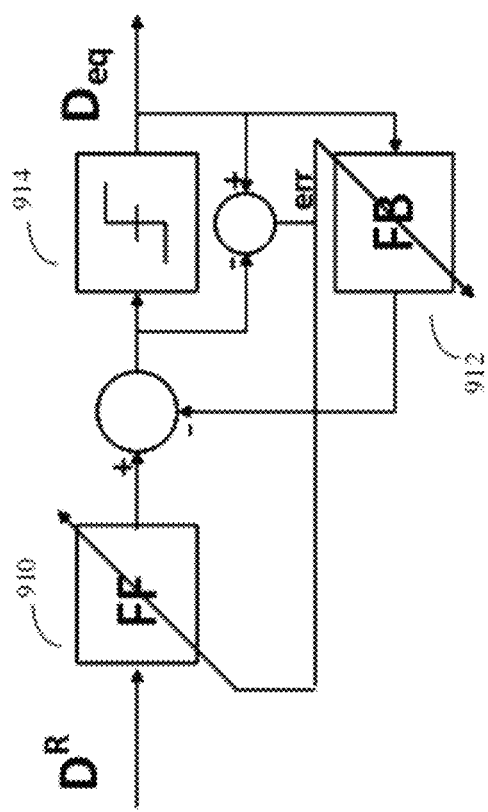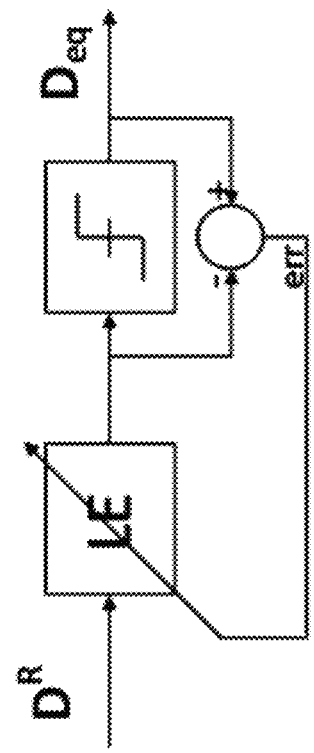
Figure 9A
Figure 9B
Figure 9C

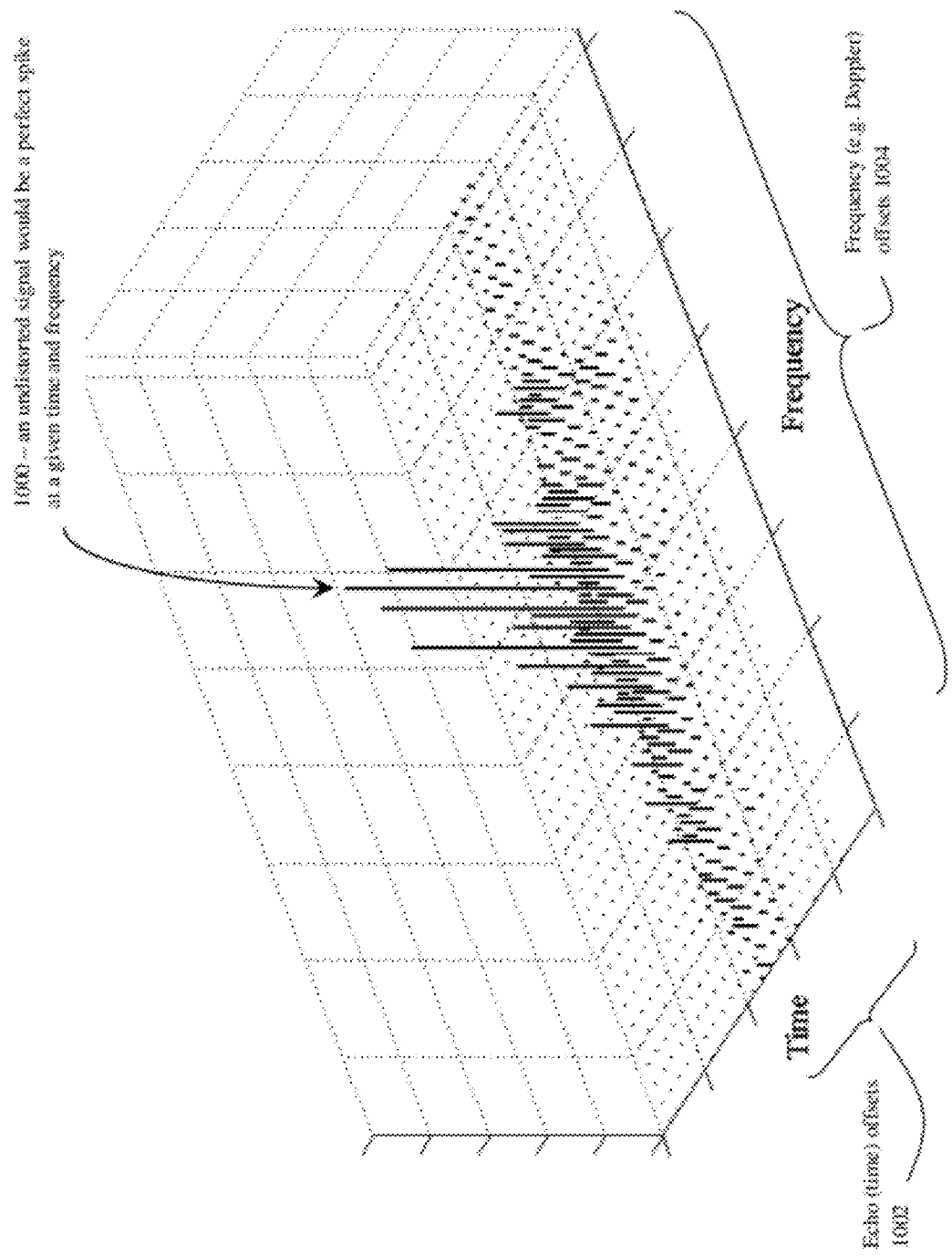

SIGNAL MODULATION METHOD RESISTANT TO ECHO REFLECTIONS AND FREQUENCY OFFSETS

CROSS REFERENCE TO RELATED APPLICATIONS

This application claims the priority benefit of provisional patent 61/615,884, "SIGNAL MODULATION METHOD RESISTANT TO ECHO REFLECTIONS AND FREQUENCY OFFSETS", inventors Ronny Hadani and Shlomo Selim Rakib, filed Mar. 26, 2012; this application is also a continuation in part of U.S. patent application Ser. No. 13/117,119, ORTHONORMAL TIME-FREQUENCY SHIFTING AND SPECTRAL SHAPING COMMUNICATIONS METHOD, inventors Selim Shlomo Rakib and Ronny Hadani, filed May 26, 2011; Ser. No. 13/117,119 in turn claimed the priority benefit of US provisional application 61/349,619, "ORTHONORMAL TIME-FREQUENCY SHIFTING AND SPECTRAL SHAPING COMMUNICATIONS METHOD", Inventors Selim Shlomo Rakib and Ronny Hadani, filed May 28, 2010; the contents of both applications are incorporated herein by reference.

BACKGROUND OF THE INVENTION

1. Field of the Invention

The invention is in the general field of communications protocols and methods, and more specifically in methods of modulating communication signals that are resistant to echo reflections, frequency offsets, and other communications channel impairments.

2. Description of the Related Art

Modern electronics communications, such as optical fiber communications, electronic wire or cable based communications, and wireless communications all operate by modulating signals and sending these signals over their respective optical fiber, wire/cable, or wireless mediums. These signals, which generally travel at or near the speed of light, can be subjected to various types of degradation or channel impairments. For example, echo signals can potentially be generated by optical fiber or wire/cable medium whenever the modulated signal encounters junctions in the optical fiber or wire/cable. Echo signals can also potentially be generated when wireless signals bounce off of wireless reflecting surfaces, such as the sides of buildings, and other structures. Similarly frequency shifts can occur when the optical fiber or wire/cable pass through different regions of fiber or cable with somewhat different signal propagating properties or different ambient temperatures; for wireless signals, signals transmitted to or from a moving vehicle can encounter Doppler effects that also result in frequency shifts. Additionally, the underlying equipment (i.e. transmitters and receivers) themselves do not always operate perfectly, and can produce frequency shifts as well.

These echo effects and frequency shifts are unwanted, and if such shifts become too large, can result in lower rates of signal transmission, as well as higher error rates. Thus methods to reduce such echo effects and frequency shifts are of high utility in the communications field.

In parent application Ser. No. 13/117,119, a novel method of wireless signal modulation was proposed operated by spreading data symbols over a larger range of times, frequencies, and spectral shapes (waveforms) than was previously employed by prior art methods (e.g. greater than such methods as Time Division Multiple Access (TDMA), Global System for Mobile Communications (GSM), Code Division Multiple Access (CDMA), Frequency Division Multiple Access (FDMA), Orthogonal Frequency-Division Multiplexing (OFDM), or other methods). This newer method, which in Ser. No. 13/117,119 was termed "Orthonormal Time-Frequency Shifting and Spectral Shaping (OTFSS)", and which here will be referred to by the simpler "OTFS" abbreviation, operated by sending data in larger "chunks" or frames than previous methods. That is, while a prior art CDMA or OFDM method might encode and send units or frames of "N" symbols over a communications link over a set interval of time, the Ser. No. 13/117,119 invention would typically be based on a minimum unit or frame of $N^2$ symbols, and often transmit these $N^2$ symbols over longer periods of time. With OTFS modulation, each data symbol or element that is transmitted is spread out to a much greater extent in time, frequency, and spectral shape space than was the case for prior art methods. As a result, at the receiver end, it will generally would take longer to start to resolve the value of any given data symbol because this symbol must be gradually built-up or accumulated as the full frame of $N^2$ symbols are received.

Put alternatively, parent application Ser. No. 13/117,119 taught a wireless combination time, frequency and spectral shaping communications method that transmitted data in convolution unit matrices (data frames) of N×N ($N^2$), where generally either all $N^2$ data symbols are received over N spreading time intervals (each composed of N time slices), or none are. To determine the times, waveforms, and data symbol distribution for the transmission process, the $N^2$ sized data frame matrix would be multiplied by a first N×N time-frequency shifting matrix, permuted, and then multiplied by a second N×N spectral shaping matrix, thereby mixing each data symbol across the entire resulting N×N matrix (termed the TFSSS data matrix in '119). Columns from this $N^2$ TFSSS data matrix were then selected, modulated, and transmitted, on a one element per time slice basis. At the receiver, the replica TFSSS matrix was reconstructed and deconvoluted, revealing the data.

BRIEF SUMMARY OF THE INVENTION

In the present application, we have both revised and extended the earlier OTFS modulation scheme testing to more fully cover additional types of communications media (i.e. optical, electronic wire/cable, as well as wireless). Additionally, we have also expanded upon the earlier OTFS concepts, and have explored in additional detail how advanced signal modulation schemes utilizing cyclically time shifted and cyclically frequency shifted waveforms can be quite useful for correcting channel impairments in a broad range of situations.

According to the present extension of the earlier '119 OTFS concept, in some embodiments, the invention may be a method of transferring a plurality of data symbols using a signal modulated to allow automatic compensation for the signal impairment effects of echo reflections and frequency offsets. This method will generally comprise distributing this plurality of data symbols into one or more N×N symbol matrices, and using these one or more N×N symbol matrices to control the signal modulation of a transmitter. Here, at the transmitter, for each N×N symbol matrix, the transmitter uses each data symbol to weight N waveforms. These N waveforms are selected from a $N^2$ sized set of all permutations of N cyclically time shifted and N cyclically frequency shifted waveforms determined according to an encoding matrix U. The net result produces, for each data symbol, N symbol-weighted cyclically time shifted and cyclically frequency shifted waveforms. Generally this encoding matrix U is chosen to be an N×N unitary matrix that has a corresponding inverse decoding matrix $U^H$. Essentially this constraint means that the encoding matrix U produces results that can ultimately be decoded.

Again at the transmitter, for each data symbol in the N×N symbol matrix, the transmitter will sum the corresponding N symbol-weighted cyclically time shifted and cyclically frequency shifted waveforms, and by the time that the entire N×N symbol matrix is so encoded, produce $N^2$ summation-symbol-weighted cyclically time shifted and cyclically frequency shifted waveforms.

The transmitter will then transmit these $N^2$ summation-symbol-weighted cyclically time shifted and cyclically frequency shifted waveforms, structured as N composite waveforms, over any combination of N time blocks or frequency blocks.

To receive and decode this transmission, the transmitted $N^2$ summation-symbol-weighted cyclically time shifted and cyclically frequency shifted waveforms are subsequently received by a receiver which is controlled by the corresponding decoding matrix $U^H$. The receiver will then use this decoding matrix $U^H$ to reconstruct the original symbols in the various N×N symbol matrices.

This process of transmission and reception will normally be done by various electronic devices, such as a microprocessor equipped, digital signal processor equipped, or other electronic circuit that controls the convolution and modulation parts of the signal transmitter. Similarly the process of receiving and demodulation will also generally rely upon a microprocessor equipped, digital signal processor equipped, or other electronic circuit that controls the demodulation, accumulation, and deconvolution parts of the signal receiver. Although, because often wireless transmitters and receivers lend themselves to discussion, in this specification often wireless examples will be used, it should be understood that these examples are not intended to be limiting. In alternative embodiments, the transmitter and receiver may be optical/optical-fiber transmitters and receivers, electronic wire or cable transmitters and receivers, or other types of transmitters in receivers. In principle, more exotic signal transmission media, such as acoustic signals and the like, may also be done using the present methods.

As previously discussed, regardless of the media (e.g. optical, electrical signals, or wireless signals) used to transmit the various waveforms, these waveforms can be distorted or impaired by various signal impairments such as various echo reflections and frequency shifts. As a result, the receiver will often receive a distorted form of the original signal. Here, the invention makes use of the insight that cyclically time shifted and cyclically frequency shifted waveforms are particularly useful for detecting and correcting for such distortions.

Because the communications signal propagates trough its respective communications media at a finite speed (often at or near the speed of light), and because the distance from the original transmitter to the receiver is usually substantially different than the distance between the transmitter, the place(s) where the echo is generated, and the distance between the place(s) where the echo is generated and the receiver, the net effect of echo reflections is that at the receiver, both the original transmitted waveforms, and a time-shifted version of the original waveforms, are received, resulting in a distorted composite signal.

By using cyclically time shifted waveforms, however, a time deconvolution device at the receiver can analyze the cyclically time varying patterns of the waveforms, determine the repeating patterns, and use these repeating patterns to help decompose the echo distorted signal back into various time-shifted version of the various signals. The time deconvolution device can also determine how much of a time-offset (or multiple time offsets) is or are required to enable the time delayed echo signal(s) to match up with the original or direct signal. This time offset value, here called a time deconvolution parameter, can both give useful information as to the relative position of the echo location(s) relative to the transmitter and receiver, and can also help the system characterize some of the signal impairments that occur between the transmitter and receiver. This can help the communications system automatically optimize itself for better performance.

In addition to echo reflections, other signal distortions occur that can result in one or more frequency shifts. Here, an easy to understand example is the phenomenon of Doppler shifts. Doppler shift or Doppler effects are the change in wave frequency that occurs when a wave transmitter moves closer or further away from a wave receiver. These frequency shifts can occur, for example, when a wireless mobile transmitter moves towards or away from a stationary receiver. If the wireless mobile transmitter is moving towards the stationary receiver, the wireless waveforms that it transmits will be offset to higher frequencies, which can cause confusion if the receiver is expecting signals modulated at a lower frequency. An even more confusing result can occur if the wireless mobile transmitter is moving perpendicular to the receiver, and there is also an echo source (such as a building) in the path of the wireless mobile transmitter. Due to Doppler effects, the echo source receives a blue shifted (higher frequency) version of the original signal, and reflects this blue shifted (higher frequency) version of the original signal to the receiver. As a result, the receiver will receive both the direct wireless waveforms at the original lower frequency, and also a time-delayed higher frequency version of the original wireless waveforms, causing considerable confusion.

Here the use of cyclically time shifted waveforms and cyclically frequency shifted waveforms can also help solve this type of problem, because the cyclic variation provides important pattern matching information that can allow the receiver to determine what portions of the received signal were distorted, as well as how much distortion was involved. Here, these cyclically varying signals allow the receiver to do a two-dimensional (e.g. time and frequency) deconvolution of the received signal. For example, the frequency deconvolution portion of the receiver can analyze the cyclically frequency varying patterns of the waveforms, essentially do frequency pattern matching, and decompose the distorted signal into various frequency shifted versions of the various signals. At the same time, this portion of the receiver can also determine how much of a frequency offset is required to cause the frequency distorted signal match up with the original or direct signal. This frequency offset value, here called a "frequency deconvolution parameter", can give useful information as to the transmitter's velocity relative to the receiver. It can help the system characterize some of the frequency shift signal impairments that occur between the transmitter and receiver.

As before, the time deconvolution part of the receiver can analyze the cyclically time varying patterns of the waveforms, again do time pattern matching, and decompose the echo distorted signal back into various time-shifted versions of the original signal. The time deconvolution portion of the receiver can also determine how much of a time-offset is required to cause the time delayed echo signal to match up with the original or direct signal. This time offset value, again called a "time deconvolution parameter", can also give useful information as to the relative positions of the echo location(s), and can also help the system characterize some of the signal impairments that occur between the transmitter and receiver.

The net effect of both the time and frequency deconvolution, when applied to transmitters, receivers, and echo sources that potentially exist at different distances and velocities relative to each other, is to allow the receiver to properly interpret the impaired echo and frequency shifted communications signals.

Further, even if, at the receiver, the energy received from the un-distorted form of the original transmitted signal is so low as to have a undesirable signal to noise ratio, by applying the appropriate, appropriate time and frequency offsets or deconvolution parameters, the energy from the time and/or frequency shifted versions of the signals, which would otherwise be contributing to noise, can instead be harnessed to contribute to the signal instead.

As before, the time and frequency deconvolution parameters can also provide useful information as to the relative positions and velocities of the echo location(s) relative to the transmitter and receiver, as well as the various velocities between the transmitter and receiver. These in turn can help the system characterize some of the signal impairments that occur between the transmitter and receiver, as well as assist in automatic system optimization methods.

Thus in some embodiments, the invention may also provide a method for an improved communication signal receiver where, due to either one or the combination of echo reflections and frequency offsets, multiple signals due to echo reflections and frequency offsets result in the receiver receiving a time and/or frequency convoluted signal representing time and/or frequency shifted versions of the $N^2$ summation-symbol-weighed cyclically time shifted and frequency shifted waveforms previously sent by the transmitter. Here, the improved receiver will further perform a time and/or frequency deconvolution of the impaired signal to correct for various echo reflections and frequency offsets. This improved receiver method will result in both time and frequency deconvoluted results (i.e. signals with higher quality and lower signal to noise ratios), as well as various time and frequency deconvolution parameters that, in addition to automatic communications channel optimization, are also useful for other purposes as well. These other purposes can include channel sounding (i.e. better characterizing the various communication system signal impairments), adaptively selecting modulation methods according to the various signal impairments, and even improvements in radar systems.

Other extensions of the '119 OTFS methods, such as alternate methods of sending blocks of waveforms, will also be discussed.

BRIEF DESCRIPTION OF THE DRAWINGS

FIG. 6A shows that the various composite waveform blocks transmitted by the transmitter can be either transmitted as a series of N consecutive time blocks (i.e. no other blocks in-between) or alternatively can be transmitted either time-interleaved with the blocks from a different symbol matrix (which in some cases may be from a different transmitter). Alternatively these waveform blocks may be frequency transposed to a one or more very different frequency ranges, and transmitted in parallel at the same time.

FIG. 6B shows that the various composite waveform blocks transmitted by the transmitter can be either transmitted as shorter duration time blocks over one or more wider frequency ranges, or as longer duration time blocks over one or more narrower frequency ranges.

FIG. 7 shows an example of a transmitter transmitting a series of N consecutive time blocks. In some embodiments, the transmitter may further incorporate a pre-equalization step to pre-compensate for various communications channel impairments such as echo reflections and frequency shifts.

FIG. 8A shows an example of improved receiver that mathematically compensates for the effects of echo reflections and frequency shifts. This time and frequency deconvolution series of math operations can additionally output deconvolution parameters that can also give information pertaining to the extent to which the echo reflections and frequency shifts distorted the underlying signal.

FIG. 8B shows an example of an improved receiver that utilizes a time and frequency deconvolution device to correct for the effects of echo reflections and frequency shifts. This time and frequency deconvolution device can additionally output deconvolution parameters that can also give information pertaining to the extent to which the echo reflections and frequency shifts distorted the underlying signal.

FIG. 9A shows an example of how echo reflections and frequency shifts can blur or impair or distort the transmitted signal.

FIG. 9B shows an example of an adaptive linear equalizer that may be used to correct for such distortions.

FIG. 9C shows an example of an adaptive decision feedback equalizer that may be used to correct for such distortions.

FIG. 10 shows a time-frequency graph giving a visualization of the various echo (time shifts) and frequency shifts that a signal may encounter during transmission. This can also be called the channel impulse response.

DETAILED DESCRIPTION OF THE INVENTION

Figure 1:
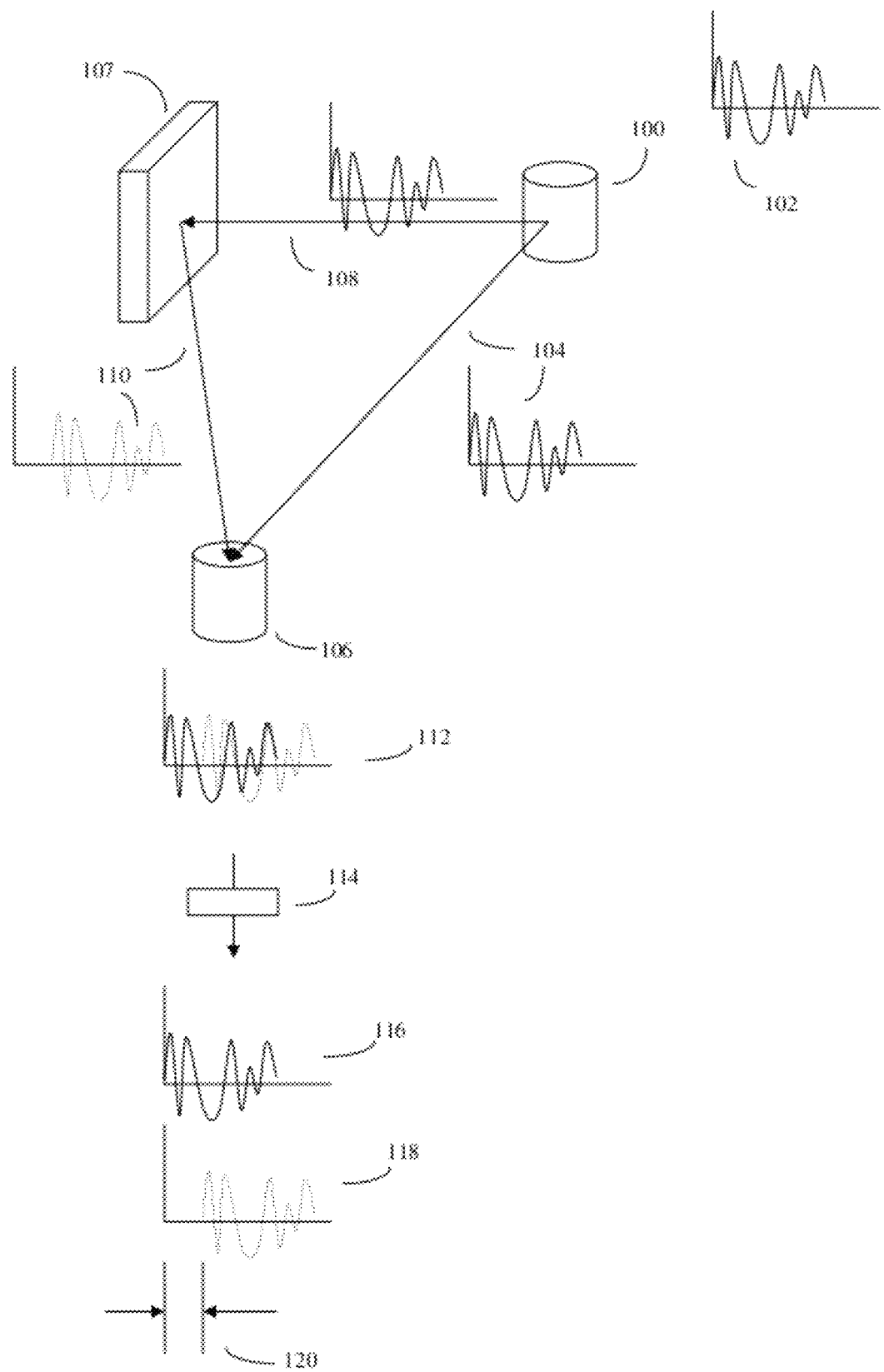
FIG. 1 shows an example of how transmitting cyclically time shifted waveforms can be useful to help a receiver perform time deconvolution of the received signal in order to compensate for various types of echo reflections.

Matrix notation: In certain places, to better convey the fact that a number of the software controlled transmitter and receiver functions can be more precisely expressed using matrix mathematics notation, often the N×N matrices such as "D", "U", and the like will be expressed using matrix bracket notation such as [D] or [U]. Note however that, in general, if the text refers a particular N×N matrix either with or without the bracket notation, the intent and results are the same. The use of brackets is intended only as a way to make the underlying N×N matrix nature of that particular matrix (e.g. D or [D]) more apparent on initial reading.

As previously discussed in parent application Ser. No. 13/117,119, in one embodiment, the OTFS methods may be viewed as being a method of transmitting at least one N×N matrix of data symbols (i.e. one frame of data [D]) over a communications link, where each frame of data is a matrix of up to $N^2$ data elements or symbols, and N would be greater than 1. This method would generally comprise obtaining a hybrid analog and digital wireless transmitter, both usually microprocessor controlled, and assigning each data element to a unique waveform (corresponding waveform) which is derived from a basic waveform of duration N time slices over one spreading time interval (i.e. the time needed to send one block of data), with a data element specific combination of a time and frequency cyclic shift of this basic waveform. According to this method, each data element in the frame of data [D] would be multiplied by its corresponding waveform producing $N^2$ weighted unique waveforms. Here, over one spreading time interval, all $N^2$ weighted unique waveforms corresponding to each data element in the fame of data [D] are then simultaneously combined, and a different unique basic waveform of duration N time slices may be used for each consecutive time-spreading interval.

Here, the notion of a time-slice will be somewhat deemphasized. Here, the main criteria is that depending on the waveforms used, the time expended to transmit the waveforms (previously termed N time slices) should be long enough, with respect to the waveform(s) to allow the waveforms to be fully transmitted. The '119 concept of a time spreading interval can be understood as the length of time needed to adequately transmit these waveforms. This was previously also termed equivalent to N time slices. In the present terminology, this may be understood a corresponding to the time needed to transmit a time block of data.

'119 taught that typically, for each consecutive time spreading interval, a set of N unique waveforms would be used, and this set of N unique waveforms would generally form an orthonormal basis.

'119 also taught that to receive this data, the receiver would receive at least one frame of data [D] over the communications link, said frame of data comprising a matrix of up to $N^2$ data elements, again N being greater than 1. The receiver would in turn correlate the received signal with the set of all $N^2$ waveforms previously assigned to each data element by the transmitter for that specific time spreading interval, and produce a unique correlation score for each one of the $N^2$ data elements. Then for each data element, the receiver would sum these correlation scores over N time-spreading intervals. The summation of these correlation scores would then reproduce the $N^2$ data elements of the at least one frame of data [D].

More specifically Ser. No. 13/117,119 taught a method of transmitting and receiving at least one N×N frame of data ([D]) over a wireless communications link; where the frame of data comprising a matrix of up to $N^2$ data elements, N being greater than 1. Here, the data elements of the frame of data ([D]) were convoluted (in the present application, the alternate term "encoded" is generally used instead for this to avoid confusion with the present teaching of time and frequency deconvolution methods) so that the value of each data element, when transmitted, would be spread over a plurality of wireless waveforms, each waveform having a characteristic frequency, and each waveform carrying the convoluted (encoded) results from a plurality of data elements from the data frame. The '119 method would transmit the convoluted (encoded) results by cyclically shifting the frequency of this plurality of wireless waveforms over a plurality of times so that the value of each data element is transmitted as a plurality of cyclically frequency shifted waveforms sent over a plurality of times. The method would also receive and deconvolute (decode) this plurality of cyclically frequency shifted waveforms sent over a plurality of times, thereby reconstructing a replica of said at least one frame of data ([D]). '119 also taught the constraint that this convolution and deconvolution would be such that an arbitrary data element of an arbitrary frame of data ([D]) could not be guaranteed to be reconstructed with full accuracy until substantially all of said plurality of cyclically frequency shifted waveforms have been transmitted and received. Here this constraint is somewhat relaxed since error correction methods can, in principle, supply some missing data. However the general thought that a substantial majority of the waveforms should be transmitted and received still remains.

'119 also taught that generally each data element (symbol) would be assigned a unique waveform, often derived from a basic waveform of duration N time slices over one spreading time interval, with a data element specific combination of a time and frequency cyclic shift of said basic waveform. '119 also taught further multiplying this data element from the frame of data [D] by its corresponding waveform, producing $N^2$ weighted unique waveforms. In some embodiments of '119, over one spreading time interval, all $N^2$ weighted unique waveforms corresponding to each data element in the fame of data [D] would be simultaneously combined. '119 also taught as well that often a different unique basic waveform of duration N time slices could be used for each consecutive time-spreading interval. Generally a set of N unique waveforms could be used for each consecutive time-spreading interval (e.g. a time block according to present nomenclature), and this set of N unique waveforms would form an orthonormal basis.

In the present application, the basic '119 OTFS concept is generalized and extended, with particular emphasis to showing, in more detail, the advantages and applications of using cyclically time shifted and cyclically frequency shifted waveforms. To do this, it is useful to focus less on the matrix math used to generate the complex waveforms, and more on the underlying cyclic time shifted and cyclically frequency shifted nature of the waveforms. As a result, in the present application, the matrix math discussion of '119, although still useful as one specific method of producing the cyclic time shifted and cyclic frequency shifted waveforms, will be deemphasized, although parts of the earlier discussion will be reiterated. For a more complete discussion of various exemplary matrix math methods potentially suitable for some embodiments of the present invention, please refer to Ser. No. 13/117,119, incorporated herein by reference.

FIG. 1 shows an example of how transmitting cyclically time shifted waveforms can be useful to help a receiver perform time deconvolution of the received signal in order to compensate for various types of echo reflections.

Here, remember that the various signals all travel at a finite speed (often at or near the speed of light). In FIG. 1, a wireless transmitter (100) is transmitting a complex cyclically time shifted and cyclically frequency shifted wireless waveform (102) in multiple directions. Some of these signals (104) go directly to the receiver (106). Other signals (108) bounce off of a wireless reflector, such as a building (107). These "echo" reflections (110) have to travel a longer distance to reach receiver (106), and thus end up being time delayed. As a result, receiver (106) receives a distorted signal (112) that is the summation of both the original (104) and the echo waveforms (110).

However since the invention relies on the transmission of cyclically time shifted waveforms, a time deconvolution device at the receiver (alternatively a time equalizer) (114) can analyze the cyclically time varying patterns of the waveforms, essentially do pattern matching, and decompose the rather complex and distorted signal back into various time-shifted versions (116) corresponding to (104), and (118) corresponding to (110) of the various signals. At the same time, the time deconvolution device (114) can also determine how much of a time-offset (120) is required to cause the time delayed echo signal (118), (110) to match up with the original or direct signal (116), (104). This time offset value (120), here called a time deconvolution parameter, can give useful information as to the relative position of the echo location(s) relative to the transmitter and receiver, and can also help the system characterize some of the signal impairments that occur between the transmitter and receiver.

Figure 2:
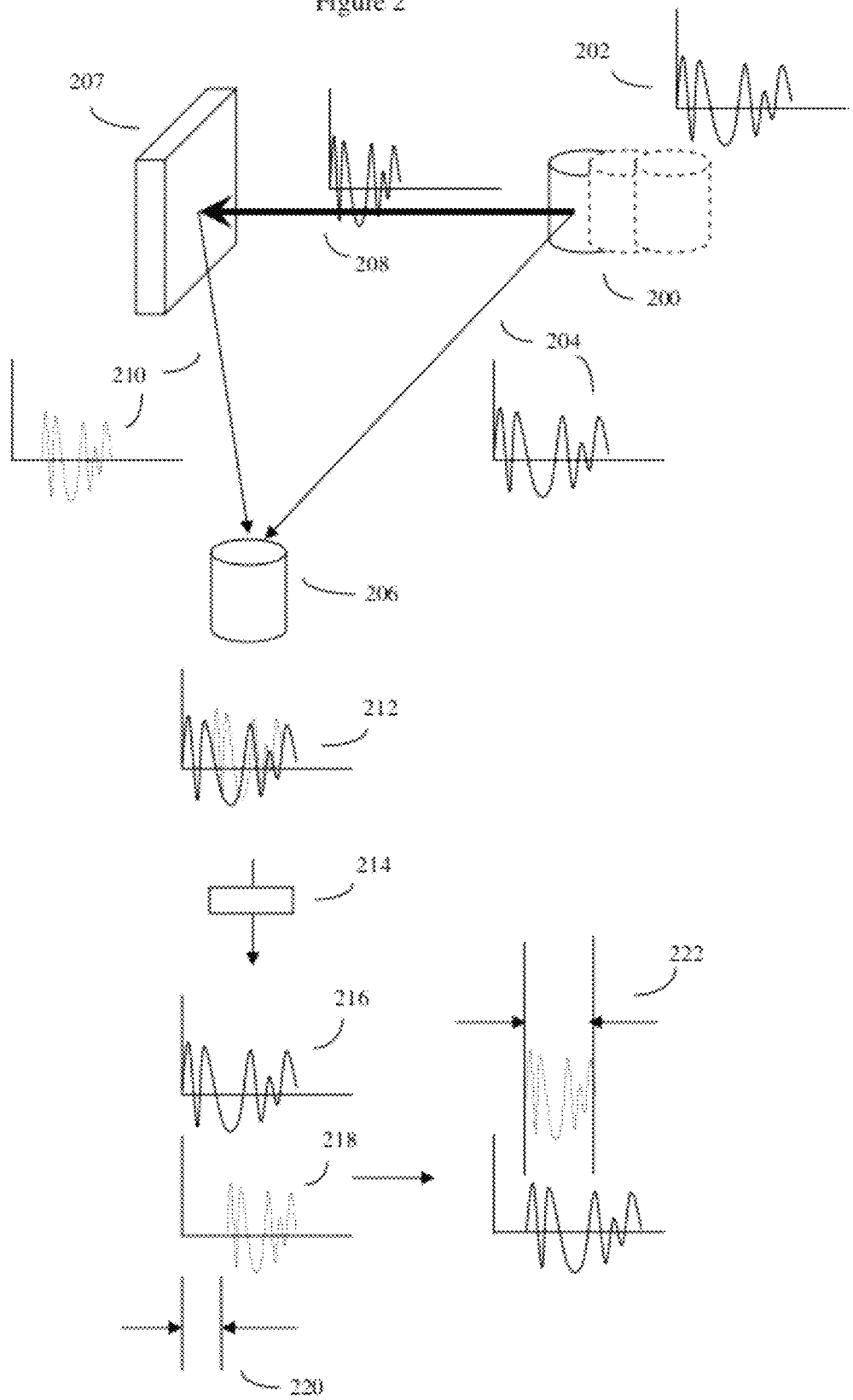
FIG. 2 shows an example of how transmitting both cyclically time shifted waveforms and cyclically frequency shifted waveforms can be useful to help a receiver to perform both time and frequency of the received signal to compensate for both echo reflections and frequency shifts—in this example Doppler effect frequency shifts.

FIG. 2 shows an example of how transmitting both cyclically time shifted waveforms and cyclically frequency shifted waveforms can be useful to help a receiver to perform both time and frequency of the received signal to compensate for both echo reflections and frequency shifts—in this example Doppler effect frequency shifts.

In FIG. 2, a moving wireless transmitter (200) is again transmitting a complex cyclically time shifted and cyclically frequency shifted wireless waveform (202) in multiple directions. Here, for simplicity, assume that transmitter (200) is moving perpendicular to receiver (206) so that it is neither moving towards nor away from the receiver, and thus there are no Doppler frequency shifts relative to the receiver (206).

Here also assume that the transmitter (200) is moving towards a wireless reflector, such as a building (207), and thus the original wireless waveform (202) will be, by Doppler effects, shifted towards a higher frequency (blue shifted) relative to the reflector (207).

Thus those these signals (204) that go directly to the receiver (206) will, in this example, not be frequency shifted. However the Doppler shifted wireless signals (208) that bounce off of the wireless reflector, here again building (207), will echo off in a higher frequency shifted form. These higher frequency shifted "echo" reflections (210) also still have to travel a longer distance to reach receiver (206), and thus also end up being time delayed as well. As a result, receiver (206) receives a doubly distorted signal (212) that is the summation of both the original (204) and the time and frequency shifted echo waveforms (210).

However since, as before, the invention relies on the transmission of cyclically time shifted waveforms, a time and frequency deconvolution device (alternatively a time and frequency adaptive equalizer) at the receiver (214) can analyze the cyclically time varying and frequency varying patterns of the waveforms, essentially do pattern matching, and decompose the very complex and distorted signal back into various time-shifted and frequency shifted versions (216) corresponding to (204), and (218) corresponding to (210) of the various signals. At the same time, the time and frequency deconvolution device (214) can also determine how much of a time-offset (220) and frequency offset (222) is required to cause the time delayed and frequency shifted echo signal (218), (210) to match up with the original or direct signal (216), (204). This time offset value (220), here called a time deconvolution parameter, and frequency offset value (222), here called a frequency deconvolution parameter, can give useful information as to the relative position of the echo location(s) relative to the transmitter and receiver, and can also help the system characterize some of the signal impairments that occur between the transmitter and receiver.

The net effect of both time and frequency deconvolutions, when applied to transmitters, receivers, and echo sources that potentially exist at different distances and velocities relative to each other, is to allow the receiver to properly interpret the impaired signal. Here, even if the energy received in the primary signal is too low, with the application of appropriate time and frequency offsets or deconvolution parameters, the energy from the time and/or frequency shifted versions of the signals can be added to the primary signal, resulting in a less noisy and more reliable signal at the receiver. Additionally, the time and frequency deconvolution parameters can useful information as to the relative positions and velocities of the echo location(s) relative to the transmitter and receiver, as well as the various velocities between the transmitter and receiver, and can also help the system characterize some of the signal impairments that occur between the transmitter and receiver.

Thus in some embodiments, the invention may also be a method to provide an improved receiver where, due to either one or the combination of echo reflections and frequency offsets, multiple signals due to echo reflections and frequency offsets result in the receiver receiving a time and/or frequency convoluted signal representing time and/or frequency shifted versions of the $N^2$ summation-symbol-weighed cyclically time shifted and frequency shifted waveforms. Here, the improved receiver will further time and/or frequency deconvolute the time and/or frequency convoluted signal to correct for said echo reflections and frequency offsets. This will result in both time and frequency deconvoluted results (i.e. signals, typically of much higher quality and lower signal to noise ratio), as well as various time and frequency deconvolution parameters that, as will be discussed, are useful for a number of other purposes.

Before going into a more detailed discussion of other applications, however, it is useful to first discuss the various waveforms in more detail.

The invention generally utilizes waveforms produced by distributing plurality of data symbols into one or more N×N symbol matrices, and using these one or more N×N symbol matrices to control the signal modulation of a transmitter. Here, for each N×N symbol matrix, the transmitter may use each data symbol to weight N waveforms, selected from a $N^2$ sized set of all permutations of N cyclically time shifted and N cyclically frequency shifted waveforms determined according to an encoding matrix U, thus producing N symbol-weighted cyclically time shifted and cyclically frequency shifted waveforms for each data symbol. This encoding matrix U is chosen to be an N×N unitary matrix that has a corresponding inverse decoding matrix $U^H$. The method will further, for each data symbol in the N×N symbol matrix, sum the N symbol-weighted cyclically time shifted and cyclically frequency shifted waveforms, producing $N^2$ summation-symbol-weighted cyclically time shifted and cyclically frequency shifted waveforms. According to the invention, the transmitter will transmit these $N^2$ summation-symbol-weighted cyclically time shifted and cyclically frequency shifted waveforms, structured as N composite waveforms, over any combination of N time blocks or frequency blocks.

Although a number of different schemes may be used to implement this method, here it is useful to briefly review some of the methods previously discussed in '119. Although not intended to be limiting, the method's and schemes of '119 provide one way to implement the present invention's modulation scheme.

As previously discussed, in parent application Ser. No. 13/117,119, again incorporated herein by reference, various waveforms can be used to transmit and receive at least one frame of data [D] (composed of a matrix of up to $N^2$ data symbols or elements) over a communications link. Here each data symbol may be assigned a unique waveform (designated a corresponding waveform), which is derived from a basic waveform.

For example, the data symbols of the data matrix [D] may be spread over a range of cyclically varying time and frequency shifts by assigning each data symbol to a unique waveform (corresponding waveform) which is derived from a basic waveform of length N time slices (in the present application the preferred terminology would be the time required to transmit this waveform, such as a time block), with a data symbol specific combination of a time and frequency cyclic shift of this basic waveform.

In '119, each symbol in the frame of data [D] is multiplied by its corresponding waveform, producing a series of $N^2$ weighted unique waveforms. Over one spreading time interval (or time block interval), all $N^2$ weighted unique waveforms corresponding to each data symbol in the fame of data [D] are simultaneously combined and transmitted. Further, a different unique basic waveform of length (or duration) of one time block (N time slices) may be used for each consecutive time-spreading interval (consecutive time block). Thus a different unique basic waveform corresponding to one time block may be used for each consecutive time-spreading interval, and this set of N unique waveforms generally forms an orthonormal basis. Essentially, each symbol of [D] is transmitted (in part) again and again either over all N time blocks, or alternatively over some combination of time blocks and frequency blocks (e.g. assigned frequency ranges).

In '119, to receive data over each time block of time, the received signal is correlated with the set of all $N^2$ waveforms previously assigned to each data symbol by the transmitter for that specific time block. (Thus just like other encoding/decoding methods, where the receiver has knowledge of the set of $N^2$ waveforms that the transmitter will assign to each data symbol). Upon performing this correlation, the receiver may produce a unique correlation score for each one of the $N^2$ data symbols. This process will be repeated over some combination of time blocks and frequency blocks until all N blocks are received. The original data matrix [D] can thus be reconstructed by the receiver by, for each data symbol, summing the correlation scores over N time blocks or frequency blocks, and this summation of the correlation scores will reproduce the $N^2$ data symbols of the frame of data [D].

Figure 3:
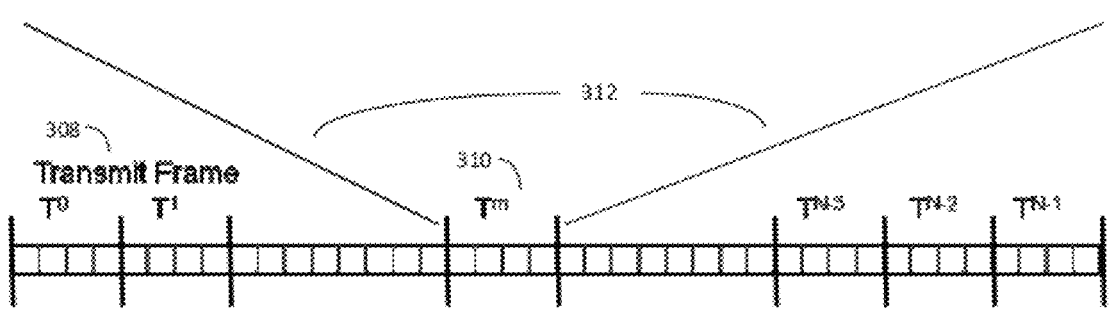
FIG. 3 shows an example of some of the basic building blocks (base vector, data vectors, Fourier Vector and Transmit vectors) that may be used to generate the cyclically time shifted and cyclically frequency shifted waveforms.

'119 FIG. 3 shows an example of some of the basic building blocks (base vector, data vectors, Fourier Vector and Transmit vectors) that may be used to encode and decode data according to the invention. Here the data vector (300) can be understood as being N symbols (often one row, column, or diagonal) of the N×N [D] matrix, the base vector (302) can be understood as being N symbols (often one row, column, or diagonal) of an N×N [$U_1$] matrix, the Fourier vector (304) can be understood as being N symbols (often one row, column, or diagonal) of an N×N [$U_2$] matrix, which will often be a Discrete Fourier Transform (DFT) or Inverse Discrete Fourier Transform (IDFT) matrix. The transmit vector (306) can be understood as controlling the transmitter's scanning or selection process, and the transmit frame (308) is composed of units Tm (310) each of which is essentially a time block or spreading time interval, which itself may be viewed as composed of a plurality of time slices. Thus the transmit vector can be understood as containing N single time-spreading intervals or N time blocks (122) (310), which in turn are composed of multiple (such as N) time slices.

Note that in contrast to '119, in some embodiments of the present invention, some of these N time blocks may be transmitted non-consecutively, or alternatively some of these N time blocks may be frequency shifted to an entirely different frequency range, and transmitted in parallel with other time blocks from the original set of N time blocks in order to speed up transmission time. This is discussed later and in more detail in FIG. 6.

Here, as previously discussed, to allow us to focus more on the underlying cyclically time shifted and cyclically shifted waveforms, the detailed aspects of one embodiment of a suitable modulation scheme, such as those previously discussed in more detail in parent application Ser. No. 13/117,119, will often be generalized and also discussed in simplified form. Thus here, for example, one way to implement the present method of "selecting from an $N^2$ set of all permutations of N cyclically time shifted and N cyclically frequency shifted waveforms" may correspond, at least in part, to an optional permutation operation P as well as to the other steps discussed in '119 and briefly reviewed here in FIGS. 3-5. Additionally, the $N^2$ set of all permutations of N cyclically time shifted and N cyclically frequency shifted waveforms may be understood, for example, to be at least partially described by a Discrete Fourier transform (DFT) matrix or an Inverse Discrete Fourier Transform matrix (IDFT). This DFT and IDFT matrix can be used by the transmitter, for example, to take a sequence of real or complex numbers and modulate them into a series of different waveforms.

As one example, the individual rows for the DFT and IDFT matrix that can be used to generate these N cyclically time shifted and N cyclically frequency shifted waveforms can be understood as Fourier Vectors. In general, the Fourier vectors may create complex sinusoidal waveforms of the type:

$$X_j^k = e^{\left(\frac{-i*2*\pi*j*k}{N}\right)}$$

where, for an N×N DFT matrix, X is the coefficient of the Fourier vector in row k column N of the DFT matrix, and j is the column number. The products of this Fourier vector can be considered to be one example of the how the various time shifted and frequency shifted waveforms suitable for use in the present invention may be generated, but again this specific example is not intended to be limiting.

In FIG. 3, the lines (312) indicate that each Fourier vector waveform (304) is manifested over the spreading time interval $T^m$ (310), which here corresponds to one time block.

Figure 4:
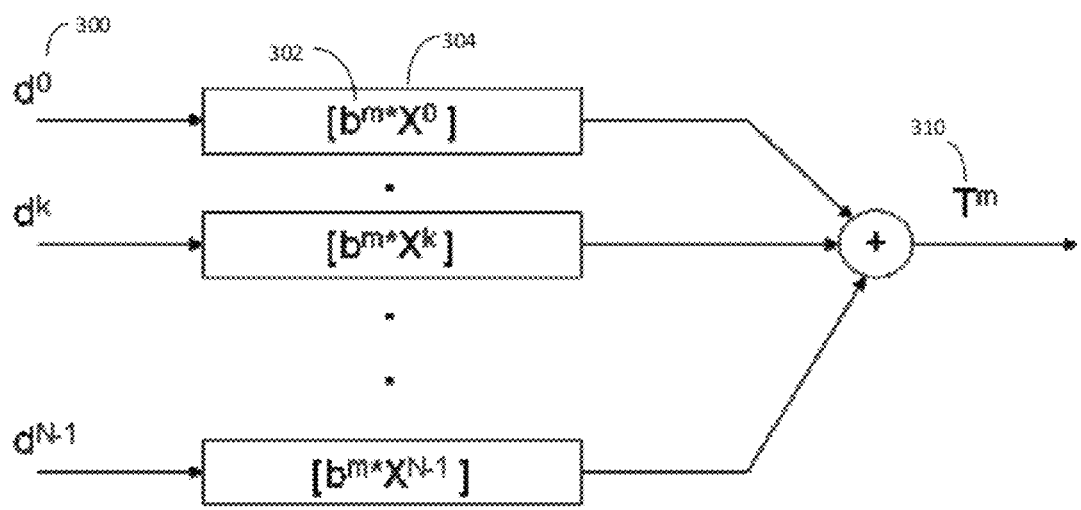
FIG. 4 shows a diagram of a cyclic time and frequency shifting transmitting method that may be used to encode and transmit data.

FIG. 4 shows a diagram of one example of a cyclic convolution method that a transmitter can use to encode data and transmit data. As previously discussed in '119, particularly in the case where [$U_1$] is composed of a cyclically permuted Legendre number of length N, then on a matrix math level, the process of convoluting the data and scanning the data can be understood alternatively as being a cyclic convolution of the underlying data. Here the $d^0$, $d^k$, $d^{N-1}$ can be understood as being the symbols or symbols of the data vector (300) component of the [D] matrix, the $b^m$ coefficients can be understood as representing the base vector (302) components of the [$U_1$] matrix, and the X coefficients can be understood as representing the Fourier vector (304) components of the [$U_2$] matrix. In FIG. 4, the sum of the various [$b^m*X^k$] can also be termed a "composite waveform". Thus the full [D] matrix of symbols will ultimately be transmitted as N composite waveforms.

Figure 5:
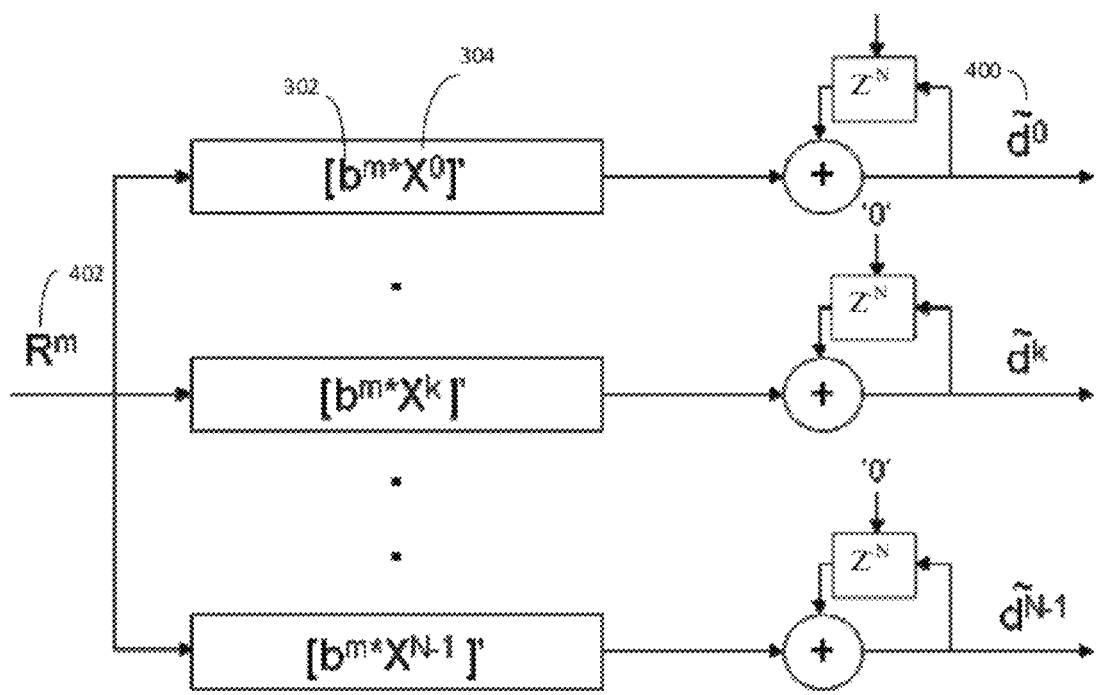
FIG. 5 shows a diagram of a cyclic time and frequency shifting receiving method that may be used to receive data.

FIG. 5 shows a diagram of a cyclic deconvolution method that a receiver may use to decode the received data according to the second form of the invention. Again, as previously discussed in '119, particularly in the case where $[U_1]$ is composed of a cyclically permuted Legendre number of length N, then the matrix math process of deconvoluting the data and reconstructing the data, that represents some of the methods used by the receiver, can be understood alternatively as being a cyclic deconvolution (cyclic decoding) of the transmitted data previously convoluted (encoded) in FIG. 4. Here the $\sim d^0$, $\sim d^k$, $\sim d^{N-1}$ can be understood as being the reconstructed symbols (symbols) of the data vector (400) component of the [D] matrix, the $b^m$ coefficients again can be understood as representing the base vector (302) components of the $[U_1]$ matrix, and the X coefficients can again be understood as representing the Fourier vector (304) components of the $[U_2]$ matrix. Here $(R_m)$ (402) is a portion of the accumulated signal (230) received and demodulated by the receiver.

Although '119 mainly focused on the example where the various waveforms were sent in a time sequential manner, here other possibilities will be discussed in more detail.

FIG. 6A shows that the various waveform blocks transmitted by the transmitter (600) can be transmitted as a series of N consecutive time blocks (i.e. no other blocks inbetween). These consecutive time blocks can either be contiguous (i.e. with minimal or no time gaps inbetween various waveform blocks) (602) or they can be sparsely contiguous (604) (i.e. with time gaps between the various waveform bocks, which may in some embodiments be used for synchronization, hand shaking, listening for other transmitters, channel assessment and other purposes.

Alternatively, the various waveform time blocks can be transmitted either time-interleaved with the blocks from one or more different symbol matrices (606, 608) (which in some cases may be from a different transmitter) in a contiguous or sparse interleaved manner (610).

As yet another alternative, some of the various waveform time blocks may be frequency transposed to entirely different frequency bands or ranges (612), (614), (616). This can speed up transmission time, because now multiple waveform time blocks can now be transmitted at the same time as different frequency blocks. As shown in (618) and (620), such multiple frequency band transmissions can also be done on a contiguous, sparse contiguous, contiguous interleaved, or sparse contiguous interleaved manner.

Here (622) and (628) represents one time block, and (624) and (630) represents the next time block. Here the various frequency ranges (612), (614), (616) can be formed, as will be described shortly, by modulating the signal according to different frequency carrier waves. Thus, for example, frequency range or band (612) might be transmitted by modulating a 1 GHz frequency carrier wave, frequency range or band (614) might be transmitted by modulating a 1.3 GHz frequency carrier wave, and band (615) might be transmitted by modulating a 1.6 GHz frequency carrier wave, and so on.

Put alternatively, the N composite waveforms, themselves derived from the previously discussed $N^2$ summation-symbol-weighted cyclically time shifted and cyclically frequency shifted waveforms, may be are transmitted over at least N time blocks. These N time blocks may be either transmitted consecutively in time (e.g. 602, 604) or alternatively transmitted time-interleaved with the N time blocks from a second and different N×N symbol matrix.

FIG. 6B shows that the various composite waveform blocks transmitted by the transmitter can be either transmitted as shorter duration time blocks over one or more wider frequency ranges, or as longer duration time blocks over one or more narrower frequency ranges.

Note that the differences from FIG. 6A. FIG. 6B shows the tradeoffs between frequency bandwidth and time. Whereas in (640), the available bandwidth for each frequency range (612), (614), and (616) is relatively large, in (642), the available bandwidth for each frequency range (632), (634) and (636) is considerably less. Here, the invention can compensate by allowing more time per time block. Thus where as for (640), with high bandwidth available, the time blocks (622) and (624) can be shorter, in (642), with lower bandwidth available, the time blocks (626) needed to transmit the composite waveforms must be made correspondingly longer.

For both FIGS. 6A and 6B then, if there is only one fundamental carrier frequency, then all N blocks must be transmitted consecutively in time as N time blocks. If there are less than N multiple fundamental carrier frequencies available, then all N blocks can be transmitted as some combination of N time blocks and N frequency blocks. If there are N or more fundamental frequencies available, then all N blocks can be transmitted over the duration of 1 time block as N frequency blocks.

FIG. 7 shows an example of a transmitter, similar to those previously discussed in '119, transmitting a series of N consecutive waveform time blocks. Here, again, the length of the time block corresponds to the N time slices previously discussed in '119. Note that this example is not intended to be limiting.

This transmitter can comprise a more digitally oriented computation end (701) and a more analog signal oriented modulation end (702). At the digital end (701), a electronic circuit, which may be a microprocessor, digital signal processor, or other similar device will accept as input the data matrix [D] (703) and may either generate or accept as inputs the $[U_1]$ (704) (e.g. a DFT/IDFT matrix) and $[U_2]$ (705) (e.g. the encoding matrix U as discussed elsewhere) matrices as well as the permutation scheme P, previously described here and in parent application Ser. No. 13/117,119, again incorporated herein by reference, as well as in the example later on in the document. The digital section will then generate what was referred to in '119 as the TFSSS matrix, and what can alternatively be termed the OTFS(time/frequency shift) matrix. Once generated, individual elements from this matrix may be selected, often by first selecting one column of N elements from the TFSSS matrix, and then scanning down this column and picking out individual elements at a time (706). Generally one new element will be selected every time block.

Thus every successive time slice, one element from the TFSSS matrix (708) can be used to control the modulation circuit (702). In one embodiment of the invention, the modulation scheme will be one where the element will be separated into its real and imaginary components, chopped and filtered, and then used to control the operation of a sin and cosine generator, producing a composite analog waveform (720). The net, effect, by the time that the entire original N×N data symbol matrix [D] is transmitted, is to transmit the data in the form of $N^2$ summation-symbol-weighted cyclically time shifted and cyclically frequency shifted waveforms, structured as N composite waveforms. In the example shown in FIG. 7, the data is transmitted over N consecutive waveforms over N time blocks. However as discussed elsewhere, other schemes are also possible, such as schemes in which some of composite waveforms are transposed to a different frequency range, and transmitted in parallel at the same time. In general the composite waveforms may be transmitted over any combination of N time blocks or frequency blocks.

Thus in this scheme (again neglecting overhead effects), elements $t_{1,1}$ through $t_{n,1}$ from the first column of matrix (708) can be sent as a composite waveform in the first time block. The next elements $t_{1,2}$ through $t_{n,2}$ from the second column of matrix (708) can be sent as a composite waveform in the next time block, and so on.

The various waveforms then travel to the receiver, where they may be demodulated and the data then reconstructed.

In some embodiments, the transmitter may further incorporate a pre-equalization step (703), and the output can be either regular OTFS signals (720) or pre-equalized OTFS signals (730). Thus if the receiver detects, for example that the transmitter's un-compensated for signal is subjected to specific echo reflections and frequency shifts, then the receiver can transmit corrective information to the transmitter pertaining to these echo reflections and frequency shifts, and the transmitter, at pre-equalization step (703), can then shape the signal so to compensate. Thus for example, if there is an echo delay, the transmitter can send the signal with an anti-echo cancellation waveform. Similarly if there is a frequency shift, the transmitter can perform the reverse frequency shift to compensate.

FIG. 8A shows an example of improved receiver that mathematically compensates for the effects of echo reflections and frequency shifts. This time and frequency deconvolution series of math operations can additionally output deconvolution parameters that can also give information pertaining to the extent to which the echo reflections and frequency shifts distorted the underlying signal. This can be done by a deconvolution device or adaptive equalizer operating at step (802A).

FIG. 8B shows an example of an improved receiver that utilizes a time and frequency deconvolution device (802B) (similar to devices (114) and (224) previously discussed in FIGS. 1 and 2) to correct for the effects of echo reflections and frequency shifts. This time and frequency deconvolution device can additionally output deconvolution parameters (808) (similar to deconvolution parameters (120), (220), and (2220 previously discussed in FIGS. 1 and 2) that can give information pertaining to the extent to which the echo reflections and frequency shifts distorted the underlying signal (720).

In FIGS. 8A and 8B, assume that composite waveform (720) has, since transmission, been distorted by various echo reflections and/or frequency shifts as previously shown in FIGS. 1 and 2, producing a distorted waveform (800) (here for simplicity a simple echo reflection delayed distortion is drawn). Whereas in FIG. 8A, this effect is corrected for mathematically, in FIG. 8B, in order to clean up the signal, a time and frequency deconvolution device (802A or 802B) (e.g. an adaptive equalizer) can analyze the distorted waveform (800) and, assisted by the knowledge that the original composite waveform was made up of N cyclically time shifted and N cyclically frequency shifted waveforms, determine what sort of time offsets and frequency offsets will best deconvolute distorted waveform (802A or 802B) back into a close representation of the original waveform (720), where here the deconvoluted waveform is represented as waveform (804). In the FIG. 8B scheme or embodiment, this deconvoluted waveform is then fed into the receiver previously shown in FIG. 5 (806) where the signal can then be further processed as previously described. In FIG. 8A embodiment, the time and frequency deconvolution can be done inside receiver (806).

In the process of doing this deconvolution, either the time and frequency deconvolution device (802A or 802B) or the mathematical deconvolution process will produce a set of deconvolution parameters (808). For example, in the simple case where the original waveform (720) was distorted by only a single echo reflection offset by time $t_{offset}$, and by the time the original waveform (720) and the $t_{offset}$ echo waveform reach the receiver, the resulting distorted signal (800) is 90% original waveform and 10% $t_{offset}$ echo waveform, then the deconvolution parameters (808) can output both the 90% 10% signal mix, as well as the $t_{offset}$ value. Typically, of course, the actual distorted signal (800) will typically consist of a number of various time and frequency offset components, and here again, in addition to cleaning this up, the time and frequency deconvolution device (802) can also report the various time offsets, frequency offsets, and percentage mix of the various components of signal (800).

As previously discussed in FIGS. 6A and 6B, the various composite waveforms in the N time blocks can be transmitted in various ways. In addition to time consecutive transmission, i.e. a first block, followed (often by a time gap which may optionally be used for handshaking or other control signals) by a second time block and then a third time block, the various blocks of composite waveforms can be transmitted by other schemes.

In some embodiments, for example in network systems where there may be multiple transmitters and potentially also multiple receivers, it may be useful to transmit the data from the various transmitters using more than one encoding method. Here, for example, a first set of N time blocks may transmit data symbols originating from a first N×N symbol matrix, and from a first transmitter using a first unitary matrix $[U_1]$. A second set of N time blocks may transmit data symbols originating from a second N×N symbol matrix, and from a second transmitter using a second unitary matrix $[U_2]$. Here depending on the embodiment, $[U_1]$ and $[U_2]$ may be identical or different. Because the signals originating from the first transmitter may encounter different impairments (e.g. different echo reflections, different frequency shifts), some schemes of cyclically time shifted and cyclically shifted waveforms may operate better than others. Here these waveforms, as well as the previously discussed unitary matrices $[U_1]$ and $[U_2]$, may be selected based on the characteristics of these particular echo reflections, frequency offsets, and other signal impairments of the system and environment of said first transmitter, said second transmitter and said receiver.

Here, for example, a receiver operating according to FIG. 8 may, for example, use its particular deconvolution parameters (808) to propose an alternative set of cyclically time shifted and cyclically frequency shifted waveforms that might give superior operation in that environment. The receiver might then and transmit this suggestion (or command) to that corresponding transmitter. This type of "handshaking" can be done using any type of signal transmission and encoding scheme desired. Thus in a multiple transmitter and receiver environment, each transmitter may attempt to optimize its signal so that its intended receiver is best able to cope with the unique impairments of that particular transmitter-receiver-communications-media situation.

In some cases, before transmitting large amounts of data, or any time as desired, a given transmitter and receiver may choose to more directly test the various echo reflections, frequency shifts, and other impairments of the transmitter and receiver's system and environment. This can be done, by, for example having the transmitter send a test signal where the plurality of data symbols are selected to be known test symbols, and the receiver knows (i.e. has a record of these particular test symbols). Since the receiver knows exactly what sort of signal it will receive, the receiver will generally have a better ability to use its time and frequency deconvolution device (802) and obtain even more accurate time and frequency deconvolution parameters (808). This will allow the system to determine the characteristics of the echo reflections, frequency offsets, and other signal impairments of the said transmitter and said receiver's system and environment even more accurately. This in turn can be used to command the transmitter to shift to more optimal communications schemes (e.g. various U matrices) suitable to the situation.

In some embodiments, when the transmitter is a wireless transmitter and the receiver is a wireless receiver, and the frequency offsets are caused by Doppler effects, the more accurate determination of the deconvolution parameters, i.e. the characteristics of the echo reflections and frequency offsets can be used in a radar system to determine the location and velocity of at least one object in said environment of said transmitter and receiver.

EXAMPLES

A microprocessor controlled transmitter may package a series of different symbols "d" (e.g. $d_1$, $d_2$, $d_3$ . . . ) for transmission by repackaging or distributing the symbols into various elements of various N×N matrices [D] by, for example assigning $d_1$ to the first row and first column of the [D] matrix (e.g. $d_1=d_{0,0}$), $d_2$ to the first row second column of the [D] matrix (e.g. $d_2=d_{0,1}$) and so on until all N×N symbols of the [D] matrix are full. Here, once we run out of d symbols to transmit, the remaining [D] matrix elements can be set to be 0 or other value indicative of a null entry.

The various primary waveforms used as the primary basis for transmitting data, which here will be called "tones" to show that these waveforms have a characteristic sinusoid shape, can be described by an N×N Inverse Discrete Fourier Transform (IDFT) matrix [W], where for each element w in [W], $$w_{j,k} = e^{\frac{i2\pi jk}{N}}$$

or alternatively $w_{j,k}=e^{ij\Theta_k}$ or $w_{j,k}=[e^{i\Theta_k j}]$. Thus the individual data elements d in [D] are transformed and distributed as a combination of various fundamental tones w by a matrix multiplication operation [W]*[D], producing a tone transformed and distributed form of the data matrix, here described by the N×N matrix [A], where [A]=[W]*[D].

To produce the invention's N cyclically time shifted and N cyclically frequency shifted waveforms, the tone transformed and distributed data matrix [A] is then itself further permuted by by modular arithmetic or "clock" arithmetic, creating an N×N matrix [B], where for each element of b of [B], $b_{i,j}= a_{i,(i+j) mod N}$. This can alternatively be expressed as [B]=Permute([A])=P(IDFT*[D]). Thus the clock arithmetic controls the pattern of cyclic time and frequency shifts.

The previously described unitary matrix [U] can then be used to operate on [B], producing an N×N transmit matrix [T], where [T]=[U]*[B], thus producing a $N^2$ sized set of all permutations of N cyclically time shifted and N cyclically frequency shifted waveforms determined according to an encoding matrix [U].

Put alternatively, the N×N transmit matrix [T]=[U]*P (IDFT*[D]).

Then, typically on a per column basis, each individual column of N is used to further modulate a frequency carrier wave (e.g. if we are transmitting in a range of frequencies around 1 GHz, the carrier wave will be set at 1 GHz), and each column the N×N matrix [T] which has N elements, thus produces N symbol-weighted cyclically time shifted and cyclically frequency shifted waveforms for each data symbol. Effectively then, the transmitter is transmitting the sum of the N symbol-weighted cyclically time shifted and cyclically frequency shifted waveforms from one column of [T] at a time as, for example, a composite waveform over a time block of data. Alternatively the transmitter could instead use a different frequency carrier wave for the different columns of [T], and thus for example transmit one column of [T] over one frequency carrier wave, and simultaneously transmit a different column of [T] over a different frequency carrier wave, thus transmitting more data at the same time, although of course using more bandwidth to do so. This alternative method of using different frequency carrier waves to transmit more than one column of [T] at the same time will be referred to as frequency blocks, where each frequency carrier wave is considered its own frequency block.

Thus, since the N×N matrix [T] has N columns, the transmitter will transmit the $N^2$ summation-symbol-weighted cyclically time shifted and cyclically frequency shifted waveforms, structured as N composite waveforms, over any combination of N time blocks or frequency blocks, as previously shown in FIG. 6A or 6B.

On the receiver side, the transmit process is essentially reversed. Here, for example, a microprocessor controlled receiver would of course receive the various columns [T] (e.g. receive the N composite waveforms, also known as the N symbol-weighted cyclically time shifted and cyclically frequency shifted waveforms) over various time blocks or frequency blocks as desired for that particular application. If for example there is a lot of available bandwidth and time is of the essence, then the transmitter will transmit, and the receiver will receive, the data as multiple frequency blocks over multiple frequency carrier waves. On the other hand, if available bandwidth is more limited, and/or time (latency) is less critical, then the transmit will transmit and the receiver will receive over multiple time blocks instead.

So effectively the receiver tunes into the one or more frequency carrier waves, and over the number of time and frequency blocks set for that particular application eventually receives the data or coefficients from original N×N transmitted matrix [T] as an N×N receive matrix [R] where [R] is similar to [T], but may not be identical due to various communications impairments.

The microprocessor controlled receiver then reverses the transmit process as a series of steps that mimic, in reverse, the original transmission process. The N×N receive matrix [R] is first decoded by inverse decoding matrix [$U^H$], producing an approximate version of the original permutation matrix [B], here called [$B^R$], where [$B^R$]=([$U^H$]*[R]).

The receiver then does an inverse clock operation to back out the data from the cyclically time shifted and cyclically frequency shifted waveforms (or tones) by doing an inverse modular mathematics or inverse clock arithmetic operation on the elements of the N×N [$B^R$] matrix, producing, for each element $b^R$ of the N×N [$B^R$] matrix, $a_{i,j}^R=b_{i,(j-i) mod N}^R$. This produces a "de-cyclically time shifted and de-cyclically frequency shifted" version of the tone transformed and distributed form of the data matrix [A], here called [$A^R$]. Put alternatively, [$A^R$]=Inverse Permute ([$B^R$]), or [$A^R$]=$P^{-1}$([$U^H$]*[R]).

The receiver then further extracts at least an approximation of the original data symbols d from the [$A^R$] matrix by analyzing the [A] matrix using an N×N Discrete Fourier Transform matrix DFT of the original Inverse Fourier Transform matrix (IDFT).

Here, for each received symbol $d^R$, the $d^R$ are elements of the N×N received data matrix $[D^R]$ where $[D^R]$=DFT*$A^R$, or alternatively $[D^R]$=DFT*$p^{-1}$($[U^H]$*$[R]$).

Thus the original $N^2$ summation-symbol-weighted cyclically time shifted and cyclically frequency shifted waveforms are subsequently received by a receiver which is controlled by the corresponding decoding matrix $U^H$ (also represented as $[U^H]$) The receiver (e.g. the receiver's microprocessor and associated software) uses this decoding matrix $[U^H]$ to reconstruct the various transmitted symbols "d" in the one or more originally transmitted N×N symbol matrices [D] (or at least an approximation of these transmitted symbols).

As previously discussed, there are several ways to correct for distortions caused by the signal impairment effects of echo reflections and frequency shifts. One way is, at the receiver front end, utilize the fact that the cyclically time shifted and cyclically frequency shifted waveforms or "tones" form a predictable time-frequency pattern, and a "dumb" deconvolution device situated at the receiver's front end can recognize these patterns, as well as the echo reflected and frequency shifted versions of these patterns, and perform the appropriate deconvolutions by a pattern recognition process. Alternatively the distortions may be mathematically corrected by the receiver's software, here by doing suitable mathematical transformations to essentially determine the echo reflected and frequency shifting effects, and solve for these effects. As a third alternative, once, by either process, the receiver determines the time and frequency deconvolution parameters of the communication media's particular time and frequency distortions, the receiver may transmit a command to the transmitter to instruct the transmitter to essentially pre-compensate or pre-encode for these effects. That is, if for example the receiver detects an echo, the transmitter can be instructed to transmit in a manner that offsets this echo, and so on.

FIG. 9A shows an example of how echo reflections and frequency shifts can blur or impair or distort the transmitted signal (900) by inducing additive noise (902). These distortions can be modeled as a 2-dimensional filter acting on the data array. This filter represents, for example, the presence of multiple echoes with time delays and Doppler shifts. To reduce these distortions, the signal can either be pre-equalized before receiver subsequent receiver processing (904), or alternatively post-equalized after the $D^R$ matrix has been recovered at (906). This equalization process may be done either by analog or digital methods. The equalized form of the received D matrix, which ideally will completely reproduce the original D matrix, is termed $D_{eq}$.

FIG. 9B shows an example of an adaptive linear equalizer that may be used to correct for such distortions. This adaptive linear equalizer can function at either step (904), optionally as a more analog method or step (906), generally as a more digital and mathematical process.

The equalizer may, in some embodiments, described in more detail in copending provisional patent 61/615,884, the contents of which are incorporated herein by reference, operate according to the function:

$$Y(k) = \sum_{L=Lc}^{Rc} C(l) * X(k-l) + \eta(k).$$

Please see application 61/615,884 for term definitions and further discussion.

FIG. 9C shows an example of an adaptive decision feedback equalizer that may be used to correct for such distortions. This equalizer both shifts the echo and frequency shifted signals on top of the main signal in a forward feedback process (910), and also then uses feedback signal cancelation methods to further remove any residual echo and frequency shifted signals in (912). The method then effectively rounds the resulting signals to discrete values.

The equalizer may, in some embodiments, also described in more detail in copending provisional application 61/615,884, operate according to the function:

$$X^s(k) = \sum_{l=L_F}^{R_F} F(l) * Y(k+l) - \sum_{l=L_B}^{-1} B(l) * X^h(k+l)$$

Where $X^H(k) = Q(X^s(k))$

As before, please see application 61/615,884 for term definitions and further discussion.

FIG. 10 shows a time-frequency graph giving a visualization of the various echo (time shifts) and frequency shifts that a signal may encounter during transmission. This can also be called the channel impulse response. If there were no echo (time shift) or frequency shifts at all, then graph 10 would show up as a single spike at a defined time and frequency. However due to various echos and frequency shifts, the original signal which could be represented as a spike at (1000) is instead spread over both time (1002) and frequency (1004), and here the problem is to correct for these effects, either before further processing at the receiver (904), or later after the receiver has taken the processing to the $D^R$ stage (906). The other alternative, pre-equalizing at the transmitter stage by pre-equalizing the signal (908) prior to transmission, can be handled by a related process.

Figure 11:
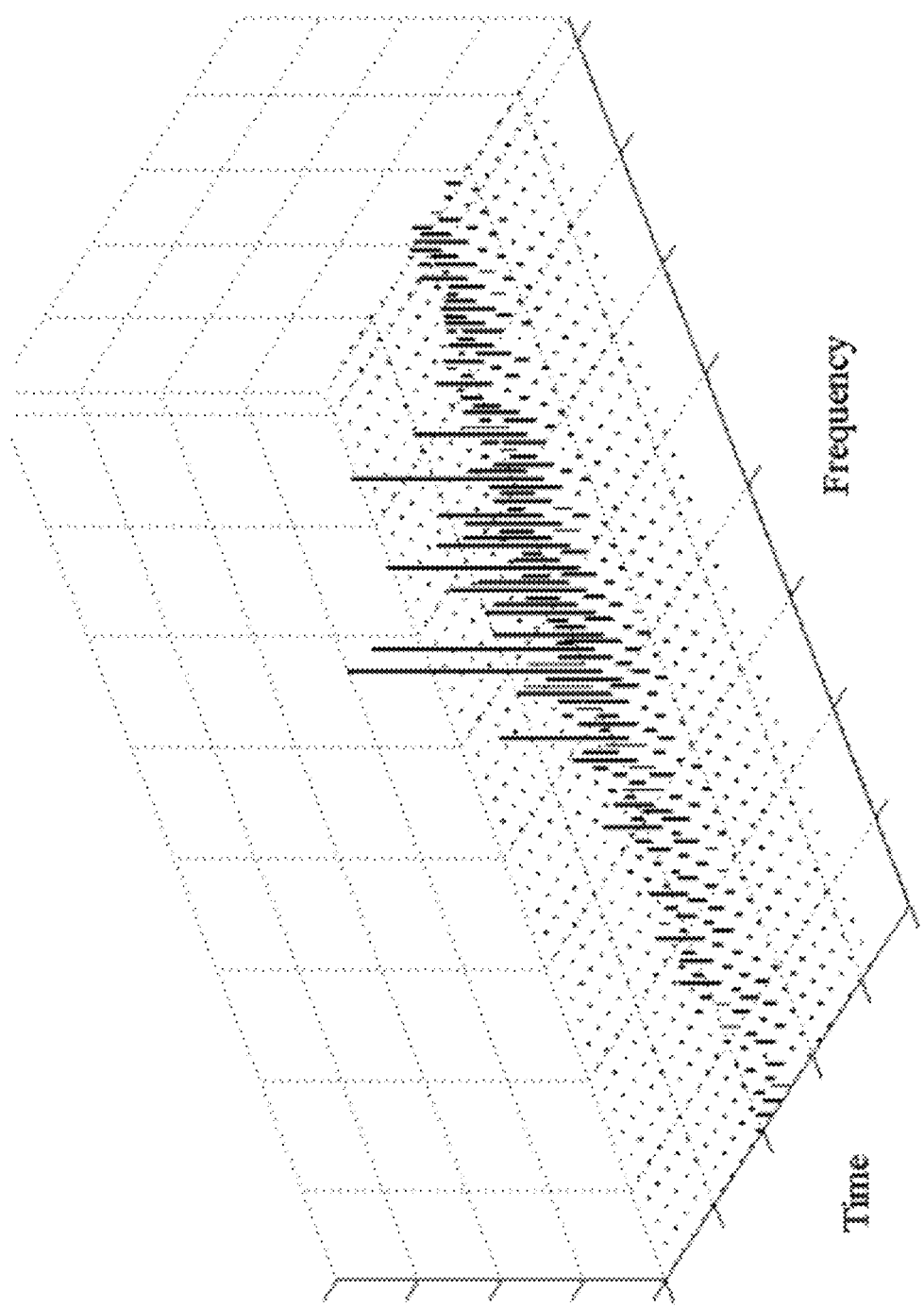
FIG. 11 shows an example of the functions that the feed forward (FF) portion of the adaptive decision feedback equalizer performs.

FIG. 11 shows an example of the functions that the feed forward (FF) portion (910) of the adaptive decision feedback equalizer (FIG. 9C) performs. To simplify, this portion (910) of the equalizer works to shift the echo or frequency shifted signals to once again coincide with the main signal, and thus enhances the intensity of the main signal while diminishing the intensity of the echo or frequency shifted signals.

Figure 12:
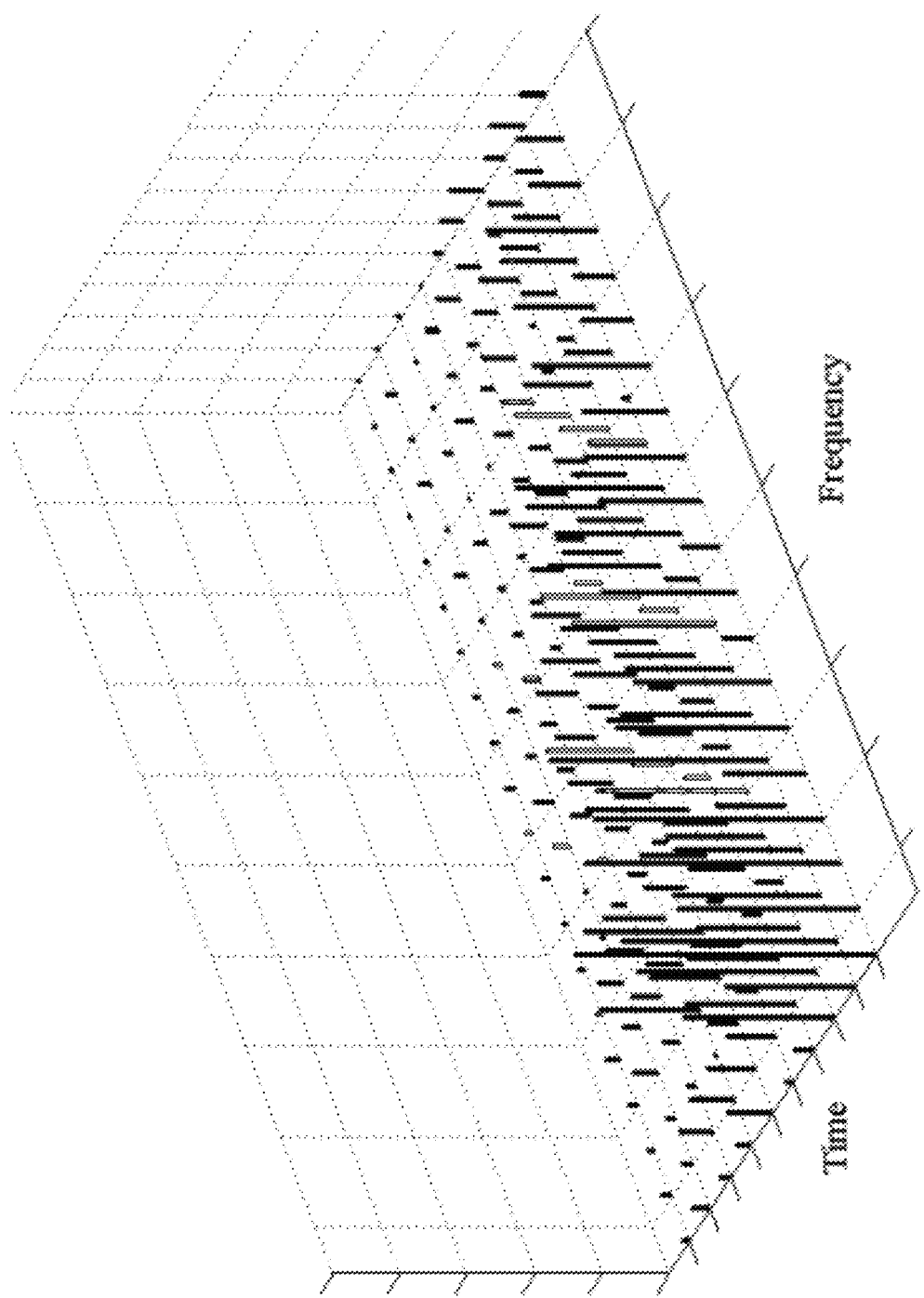
FIG. 12 shows an example of the functions of the Feedback (FB) portion of the adaptive decision feedback equalizer in action.

FIG. 12 shows an example of the functions of the Feedback (FB) portion (912) of the adaptive decision feedback equalizer (FIG. 9C) in action. After the Feed forward (FF) portion (910) of the equalizer has acted to mostly offset and the echo and frequency shifted signals, there will still be some residual echo and frequency signals remaining. The Feedback (FB) portion (912) essentially acts to cancel out those trace remaining echo signals, essentially acting like an adaptive canceller for this portion of the system.

The quantizer portion of the adaptive decision feedback equalizer (914) then acts to "round" the resulting signal to the nearest quantized value so that, for example, the symbol "1" after transmission, once more appears on the receiving end as "1" rather than "0.999".

As previously discussed, an alternative mathematical discussion of the equalization method, particularly suitable for step 802B, is described in provisional application 61/615,884, the contents of which are incorporated herein by reference.

Figure 13:
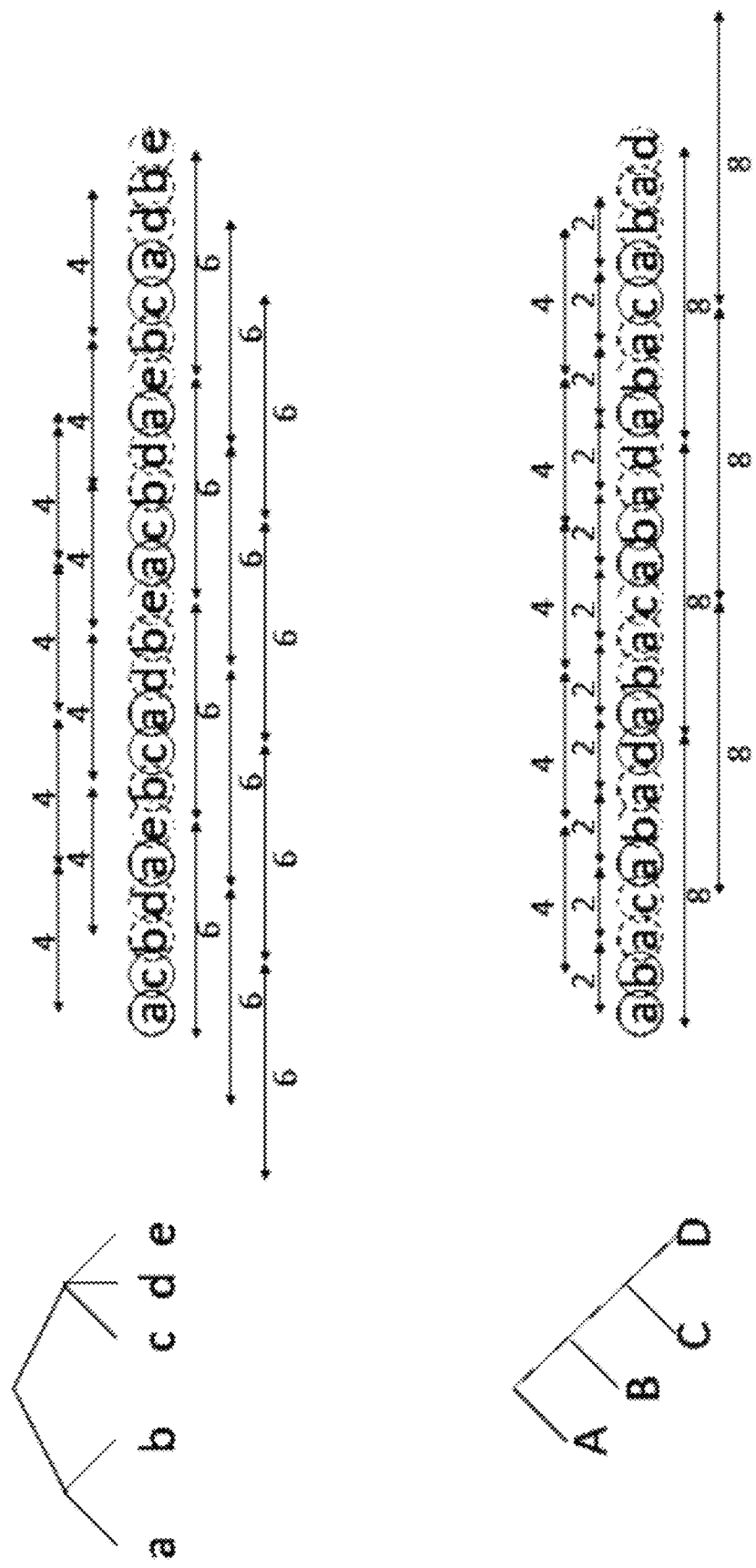
FIG. 13 shows that it may be useful to transmit various different time blocks in an interleaved scheme where the time needed to transmit all N blocks may vary between different data matrices D, and wherein the interleaving scheme is such as to take the latency, that is the time needed to transmit all N blocks, into account according to various optimization schemes.

Final interleaving discussion:

Returning to the interleaving concepts, FIG. 13 shows that it may be useful to transmit various different time blocks in an interleaved scheme where the time needed to transmit all N blocks may vary between different data matrices D, and wherein the interleaving scheme is such as to take the latency, that is the time needed to transmit all N blocks, into account according to various optimization schemes.

The invention claimed is:

1. A method of transferring a plurality of data symbols using a signal modulated to allow automatic compensation for the signal impairment effects of echo reflections and frequency offsets, said method comprising:
distributing said plurality of data symbols into one or more N×N symbol matrices;
using said one or more N×N symbol matrices to control the signal modulation of a transmitter, wherein for each said N×N symbol matrix, said transmitter uses each data symbol to weight N waveforms, selected from a $N^2$ sized set of all permutations of N cyclically time shifted and N cyclically frequency shifted waveforms determined according to an encoding matrix U, thus producing N symbol-weighted cyclically time shifted and cyclically frequency shifted waveforms for each data symbol;
wherein said encoding matrix U is chosen to be an N×N unitary matrix that has a corresponding inverse decoding matrix $U^H$;
for each data symbol in said N×N symbol matrix, summing the N symbol-weighted cyclically time shifted and cyclically frequency shifted waveforms, producing $N^2$ summation-symbol-weighted cyclically time shifted and cyclically frequency shifted waveforms;
and transmitting said $N^2$ summation-symbol-weighted cyclically time shifted and cyclically frequency shifted waveforms, structured as N composite waveforms, over any combination of N time blocks or frequency blocks.

2. The method of claim 1, wherein N is greater than 1.

3. The method of claim 1, wherein said signal is a wireless signal, or wherein said signal is an optical or electrical signal carried over an optical or electrical current conducting wire, fiber, or cable; and
wherein said frequency offsets are caused by either Doppler shifts or other non-Doppler effects.

4. The method of claim 1, wherein said $N^2$ summation-symbol-weighted cyclically time shifted and cyclically frequency shifted waveforms are subsequently received by a receiver which is controlled by said corresponding decoding matrix $U^H$; and
using said decoding matrix $U^H$ to enable said receiver to reconstruct the transmitted symbols in said one or more N×N symbol matrices.

5. The method of claim 4, wherein due to either one or the combination of echo reflections and frequency offsets, multiple signals due to echo reflections and frequency offsets result in said receiver receiving a time and frequency convoluted signal representing time and frequency shifted versions of said $N^2$ summation-symbol-weighed cyclically time shifted and frequency shifted waveforms;
further time and frequency deconvoluting said time and frequency convoluted signal at said receiver to correct for said echo reflections and frequency offsets;
thus producing time and frequency deconvoluted results, and time and frequency deconvolution parameters.

6. The method of claim 5, wherein said plurality of data symbols are selected to be known test symbols, said receiver has a record of said known test symbols, further using said time and frequency deconvolution parameters obtained during the time and frequency deconvolution of said time and frequency convoluted signal to determine the characteristics of the echo reflections frequency offsets, and other signal impairments of the said transmitter and said receiver's system and environment.

7. The method of claim 6, in which said characteristics of the echo reflections, frequency offsets, and other signal impairments of said transmitter and said receiver's system and environment are used to select an encoding matrix U and a decoding matrix $U^H$ with properties selected for superior performance in said system and environment.

8. The method of claim 1, wherein said $N^2$ summation-symbol-weighted cyclically time shifted and cyclically frequency shifted waveforms, structured as N composite waveforms, are transmitted over at least N time blocks.

9. The method of claim 8, wherein for each said N×N symbol matrices, all N time blocks are either transmitted consecutively in time;
or wherein for each said N×N symbol matrices, the N time blocks from a first said N×N symbol matrix are transmitted time-interleaved with the N time blocks from a second and different N×N symbol matrix.

10. The method of claim 9, in which a first set of N time blocks from a first said N×N symbol matrix originate from a first transmitter using a first unitary matrix $U_1$, and a second set of N time blocks originate from a second said N×N symbol matrix from a second transmitter using a second unitary matrix $U_2$;
In which $U_1$ and $U_2$ may be identical or different; and
in which $U_1$ and $U_2$ may be selected based on the characteristics of the echo reflections, frequency offsets, and other signal impairments of the system and environment of said first transmitter, said second transmitter and said receiver.

11. A method of transferring a plurality of data symbols using a wireless signal modulated to allow automatic compensation for the wireless signal impairment effects of echo reflections and frequency offsets, said method comprising:
Distributing said plurality of data symbols into one or more N×N symbol matrices;
Using said one or more N×N symbol matrices to control the wireless signal modulation of a wireless transmitter, wherein for each said N×N symbol matrix, said wireless transmitter uses each data symbol to weight N waveforms, selected from a $N^2$ sized set of all permutations of N cyclically time shifted and N cyclically frequency shifted waveforms determined according to an encoding matrix U, thus producing N symbol-weighted cyclically time shifted and cyclically frequency shifted waveforms for each data symbol;
Wherein said encoding matrix U is chosen to be an N×N unitary matrix that has a corresponding inverse decoding matrix $U^H$;
For each data symbol in said N×N symbol matrix, summing the N symbol-weighted cyclically time shifted and cyclically frequency shifted waveforms, producing $N^2$ summation-symbol-weighted cyclically time shifted and cyclically frequency shifted waveforms;
And transmitting said $N^2$ summation-symbol-weighted cyclically time shifted and cyclically frequency shifted waveforms, structured as N composite waveforms, over any combination of N time blocks or frequency blocks.

12. The method of claim 11, wherein said $N^2$ summation-symbol-weighted cyclically time shifted and cyclically frequency shifted waveforms are subsequently received by a wireless receiver which is controlled by said corresponding decoding matrix $U^H$; and Using said decoding matrix $U^H$ to enable said wireless receiver to reconstruct the transmitted symbols in said one or more N×N symbol matrices.

13. The method of claim 12, wherein due to either one or the combination of echo reflections and frequency offsets, multiple signals due to echo reflections and frequency offsets result in said receiver receiving a time and frequency convoluted signal representing time and frequency shifted versions of said $N^2$ summation-symbol-weighed cyclically time shifted and frequency shifted waveforms;

further time and frequency deconvoluting said time and frequency convoluted signal at said receiver to correct for said echo reflections and frequency offsets;

thus producing time and frequency deconvoluted results, and time and frequency deconvolution parameters.

14. The method of claim 13, wherein said plurality of data symbols are selected to be known test symbols, said receiver has a record of said known test symbols, further using said time and frequency deconvolution parameters obtained during the time and frequency deconvolution of said time and frequency convoluted signal to determine the characteristics of the echo reflections, frequency offsets, and other signal impairments of said transmitter and said receiver's system and environment.

15. The method of claim 14, in which said characteristics of the echo reflections, frequency offsets, and other signal impairments of said transmitter and said receiver's system and environment are used to select an encoding matrix U and a decoding matrix $U^H$ with properties selected for superior performance in said system and environment.

16. The method of claim 14, wherein at least some of said frequency offsets are caused by velocity induced Doppler effects, used in a radar system to determine the location and velocity of at least one object in said environment of said transmitter and receiver.

17. The method of claim 11, wherein said $N^2$ summation-symbol-weighted cyclically time shifted and cyclically frequency shifted waveforms, structured as N composite waveforms, are transmitted over at least N time blocks.

18. The method of claim 17, wherein for each said N×N symbol matrices, all N time blocks are either transmitted consecutively in time;

or wherein for each said N×N symbol matrices, the N time blocks from a first said N×N symbol matrix are transmitted time-interleaved with the N time blocks from a second and different N×N symbol matrix.

19. The method of claim 18, in which a first set of N time blocks from a first said N×N symbol matrix originate from a first wireless transmitter using a first unitary matrix $U_1$, and a second set of N time blocks originate from a second said N×N symbol matrix from a second wireless transmitter using a second unitary matrix $U_2$;

In which $U_1$ and $U_2$ may be identical or different; and in which $U_1$ and $U_2$ may be selected based on the characteristics of the echo reflections, frequency offsets, and other signal impairments of the system and environment of said first transmitter, said second transmitter and said wireless receiver.

20. The method of claim 11, wherein N is greater than 1.

* * * * *